United States Patent
Berget et al.

(10) Patent No.: US 12,145,884 B2
(45) Date of Patent: Nov. 19, 2024

(54) ASPHALT SLURRY SEAL COMPOSITION

(71) Applicant: Omya International AG, Oftringen (CH)

(72) Inventors: Eric Berget, Sharonville, OH (US); Rolf A. Ahonen, Temecula, CA (US); Dino D. Papagianidis, Mason, OH (US)

(73) Assignee: Omya International AG, Oftringen (CH)

( * ) Notice: Subject to any disclaimer, the term of this patent is extended or adjusted under 35 U.S.C. 154(b) by 308 days.

(21) Appl. No.: 17/454,189

(22) Filed: Nov. 9, 2021

(65) Prior Publication Data

US 2023/0147210 A1    May 11, 2023

(51) Int. Cl.
*C04B 26/26*       (2006.01)
*C04B 14/02*       (2006.01)
(Continued)

(52) U.S. Cl.
CPC ............ *C04B 26/26* (2013.01); *C04B 14/022* (2013.01); *C04B 14/104* (2013.01); *C04B 14/28* (2013.01);
(Continued)

(58) Field of Classification Search
CPC ..... C04B 26/26; C04B 14/022; C04B 14/104; C04B 14/28; C04B 18/0481; C04B 24/045; C04B 2103/0079; C04B 2111/0075
See application file for complete search history.

(56) References Cited

U.S. PATENT DOCUMENTS

| 7,981,517 B2 | 7/2011 | Walther et al. |
| 8,664,303 B2 | 3/2014 | Martin |

(Continued)

FOREIGN PATENT DOCUMENTS

| EP | 1712523 A1 | 10/2006 |
| EP | 1712597 A1 | 10/2006 |

(Continued)

OTHER PUBLICATIONS

Li et al. "Studies on the properties of modified heavy calcium carbonate and SBS composite modified asphalt" in Construction and Building Materials, vol. 218, pp. 413-423, 2019 (Year: 2019).*

(Continued)

*Primary Examiner* — Pamela H Weiss
(74) *Attorney, Agent, or Firm* — Heslin Rothenberg Farley & Mesiti, P.C.

(57) ABSTRACT

The present invention relates to an asphalt slurry seal composition comprising a mineral filler comprising an inorganic mineral blend having a multi-modal particle size distribution comprising at least a first maximum in the range of about 0.1 μm to about 15 μm and a second maximum in the range about 5 μm to about 35 μm, wherein about 5 wt. % to about 40 wt. % of the particles in the inorganic mineral blend (dry weight) are in the range of about 0.1 μm to about 15 μm, a pigment component comprised of at least one pigment, an additive component comprising at least one rheology modifier, an asphalt emulsion, optionally one or more functional minerals, and water. Further, the particles of the inorganic mineral blend may be subjected to surface treatments.

23 Claims, 7 Drawing Sheets

(51) Int. Cl.
    *C04B 14/10*     (2006.01)
    *C04B 14/28*     (2006.01)
    *C04B 18/04*     (2006.01)
    *C04B 24/04*     (2006.01)
    *C04B 103/00*     (2006.01)

(52) U.S. Cl.
    CPC ........ *C04B 18/0481* (2013.01); *C04B 24/045* (2013.01); *C04B 2103/0079* (2013.01)

(56) References Cited

U.S. PATENT DOCUMENTS

| | | | |
|---|---|---|---|
| 2003/0032707 A1* | 2/2003 | Hemmings | C08K 3/26 524/425 |
| 2017/0008803 A1* | 1/2017 | Muncy | C08L 95/005 |
| 2020/0299511 A1 | 8/2020 | Avramidis | |

FOREIGN PATENT DOCUMENTS

| | | |
|---|---|---|
| EP | 2447213 A1 | 10/2010 |
| EP | 2524898 A1 | 11/2010 |
| EP | 2371766 B1 | 3/2013 |
| JP | 3464863 B2 | 8/2003 |
| WO | 2013142473 A1 | 9/2013 |
| WO | 2014060286 A1 | 4/2014 |
| WO | 2014128087 A1 | 8/2014 |
| WO | 2017011384 A1 | 1/2017 |

OTHER PUBLICATIONS

Yamaguchi et al. "Effects of Film Thickness, Wavelength, and Carbon Black on Photodegradation of Asphalt" in Journal of the Japan Petroleum Institute, 48, (3), pp. 150-155, 2005 (Year: 2005).*

Zare-Shahabadi et al. "Preparation and rheological characterization of asphalt binders reinforced with layered silicate nanoparticles" in Construction and Building Materials, vol. 24, pp. 1239-1244, 2010 (Year: 2010).*

Wei et al., "Characterization of Asphalt Binders Based on Chemical and Physical Properties", International GPC Symposium, 28 pages. 1994 (Year: 1994).*

Tadros, "Rheology of Dispersions Principles and Applications", Wiley, 219 pages.. 2010.

Harrison et al., "A Differential Scanning Calorimetry Study of Asphalt Binders", Strategic Highway Research Program: National Research Council, 49 pages. 1992.

Ronald et al., "Asphalt Emulsion Formulation: State-of-the-art and Dependency of Formulation on Emulsion Properties", Constructions and Building Materials, pp. 162-173. 2016.

"A Basic Asphalt Emulsion Manual", Series 19, 3rd Edition, Asphalt Emulsion Manufactures Association & Asphalt Institute, 140 pages. Mar. 1, 2004.

Johnson et al., "Barite (Barium)—Chapter D of Critical Mineral Resources of the United States—Economic and Environmental Geology and Prospects for Future Supply", USGS, Professional Paper 1802-D, U.S. Department of the Interior, 30 pages. 2017.

Sealmaster, Safety Data Sheet for MasterSeal Pavement Sealer, 6 pages. Jun. 23, 2014.

Henry, Safety Data Sheet for B.K. Airport+ All Season Asphalt Driveway Sealer, 8 pages. Dec. 3, 2015.

Henry, Safety Data Sheet for Driveway Asphalt Resurfacer, 8 pages. Dec. 3, 2015.

Gardner-Gibson, Safety Data Sheet for Black Jack Ultra-Maxx 1000 Driveway Sealer, 7 pages, Jun. 3, 2015.

Sealbest, Safety Data Sheet for SealBest 800 Fast-Drying Supreme Driveway Sealer and Filler, 7 pages, May 15, 2015.

Dalton Enterprises, Inc., Safety Data Sheet for Latexite(R) Ultra Shield(TM) Asphalt Sealer, 7 pages. Apr. 9, 2015.

Rust-Oluem Corporation, Safety Data Sheet for W FL BLK 2300 BR TPCT BLCKTP Filler SLR, 6 pages, Sep. 23, 2014.

Gardner-Gibson, Safety Data Sheet for Gardner Driveaseal Blacktop Driveway Sealer, 7 pages, Mar. 6, 2015.

Ippolito et al., "Impact of Bimodal Particle Size Distribution Ratio of Functional Calcium Carbonate Filler on Thermal and Flowability Properties of Polyamide 12", Applied Sciences, vol. 11, No. 641, 13 pages . Jan. 11, 2021.

* cited by examiner

A

B

A

B

A

B

| Accelerated Weather Testing for Asphalt Sealer (without carbon black) | | | | | |
|---|---|---|---|---|---|
| Time (hours) | $t_0$ | $t_{250}$ | $t_{500}$ | $t_{750}$ | $t_{1000}$ |
| L* | 22.66 | 23.23 | 23.01 | 23.62 | 24.02 |
| b* | -0.26 | 2.77 | 3.48 | 4.52 | 4.85 |

FIG. 6

| Accelerated Weather Testing for Asphalt Sealer (with carbon black) | | | | | |
|---|---|---|---|---|---|
| Time (hours) | $t_0$ | $t_{250}$ | $t_{500}$ | $t_{750}$ | $t_{1000}$ |
| L* | 22.5 | 18.43 | 16.53 | 15.59 | 15.56 |
| b* | -0.78 | 1.99 | 1.36 | 0.72 | 0.39 |

FIG. 7

ASPHALT SLURRY SEAL COMPOSITION

FIELD OF THE INVENTION

The present invention relates to asphalt slurry seals with improved durability and/or other desired characteristics. More particularly, the present invention relates to asphalt slurry seals comprising an inorganic mineral blend having a multi-modal particle distribution, and to methods of making thereof. In certain embodiments, the inorganic mineral blend comprises surface-treated and/or untreated calcium carbonate particles.

BACKGROUND

Asphalt compositions have a wide number of applications, including but not limited to the production of aggregate pavement. Asphalt naturally breaks down over time due to traffic and environmental conditions. One maintenance treatment method is to apply an asphalt slurry seal, which creates a new wear surface and provides an aesthetically pleasing fresh look to the asphalt. Asphalt slurry seals are a mixture of asphalt emulsion, mineral filler, functional minerals, pigments, and water. Additionally, functional additives, e.g., rubber, polymers, and/or polyphenols, may be optionally added to modify different properties, e.g., deformation, cracking, viscosity, and/or strength.

More specifically, U.S. Pat. No. 8,664,303 B2 refers to a bituminous asphalt binder material modified by the addition of crumb rubber or ground tire rubber and polyphosphoric acid, which improves elastic behavior and road resistance to permanent deformation, fatigue cracking, and thermal cracking. Further, U.S. Publication No. 2020/0299511 A1 refers to an asphalt composition modified by the addition of a polymer and a basic salt, such as aluminum sulfate, to improve drying time, setting time, and viscosity. Moreover, U.S. Pat. No. 7,981,517 B2 refers to a bituminous asphalt composition modified by an interpolymer, which improves heat and UV stability; the composition has various applications in roofing and paving. In addition, Japanese Patent No. 03464863 B2 refers to an oil-in-water type asphalt emulsion that is modified by the addition of polyphenol, which enhances storability, adhesion, strength, and durability.

Although individually these functional additives may improve certain properties of an asphalt slurry seal, they may also give rise to disadvantages. For example, the addition of styrene butadiene rubber (SBR) (e.g., crumb rubber) affects the viscosity of asphalt slurry seals by decreasing the mobility of the constituent particles and such affect is greater the larger the particles. Although the addition of polyphosphoric acid may help offset the increase in viscosity, polyphosphoric acid itself can lead to increased susceptibility to moisture penetration damage, thereby decreasing the overall durability of the asphalt slurry seal. Furthermore, it is often the case that these functional additives increase the cost of the asphalt slurry seal.

Therefore, there is a need for asphalt slurry seals with improved durability, minimal to no disadvantages resulting from modification of the asphalt slurry seal composition, and/or with minimal increase to cost or a reduction in cost. The compositions described herein address these and other needs.

SUMMARY OF THE INVENTION

In view of the above, there remains an interest in developing asphalt slurry seals with improved and/or comparable durability at no increase in cost or even a reduction in cost. Ideally, new compositions for such purposes overcome or off-set the aforementioned disadvantages of comparable compositions already known in the field.

Accordingly, it is an object of the present invention to achieve and/or improve asphalt slurry seal durability, color and/or other desired properties through the addition of an inorganic mineral filler with a small specific surface area, such as calcium carbonate, having a multi-modal particle distribution. In embodiments of the invention, the durability, color and/or other desired properties of asphalt slurry seals may be modulated by controlling the modes of inorganic mineral filler particle distribution. In another embodiment of the invention, the durability of asphalt slurry seals may be further modulated by surface treating a least a portion of the multi-modal inorganic mineral filler.

It is also an object of the present invention to reduce the overall cost of the asphalt slurry seal by modulating the composition. A non-limiting example is an asphalt slurry seal comprising a bi-modal blend of mineral filler with minimalized specific surface area, such as calcium carbonate, wherein the overall cost of the asphalt sealer is reduced by as much as 15%.

The foregoing and other objects are solved by the subject matter as defined in the claims. According to one aspect of the present invention, as asphalt slurry seal comprises a mineral filler comprising an inorganic mineral blend, wherein the inorganic mineral blend has a multi-modal particle size distribution comprising at least a first maximum and a second maximum. The first maximum is in the range of about 0.1 µm to about 15 µm; the second maximum is in the range of about 5 µm to about 35 µm; and about 5 wt. % to about 40 wt. % of the particles in the inorganic mineral blend (dry weight) fall within a first distribution represented by the first maximum and are in the range of about 0.1 µm to about 15 µm.

According to another aspect of the present invention, a process for preparing an asphalt slurry seal as disclosed herein is provided. The process comprises providing a mineral filler comprising an inorganic mineral blend, wherein the inorganic mineral blend has a multi-modal particle size distribution with at least a first maximum and a second maximum, wherein the first maximum is in the range of about 0.1 µm to about 15 µm and the second maximum is in the range of about 5 µm to about 35 µm, and about 5 wt. % to about 40 wt. % of the particles in the inorganic mineral blend (dry weight) are in the range of about 0.1 µm to about 15 µm; and providing an additive component comprised of at least one rheology modifier; a pigment component comprised of at least one pigment, and water; forming a suspension by mixing the water, the mineral filler, the pigment component, and the additive component; providing an asphalt emulsion and optionally one or more functional minerals; mixing the asphalt emulsion into the suspension; and mixing the optional one or more functional minerals into the suspension.

BRIEF DESCRIPTION OF THE FIGURES

FIG. 6 is a series of images showing an asphalt slurry seal lacking carbon black as applied to a substrate over the course of 1000 hours of accelerated weather testing;

FIG. 7 is a series of images showing an asphalt slurry seal, in accordance with the present disclosure, as applied to a substrate over the course of 1000 hours of accelerated weather testing;

DETAILED DESCRIPTION

Figure 1:
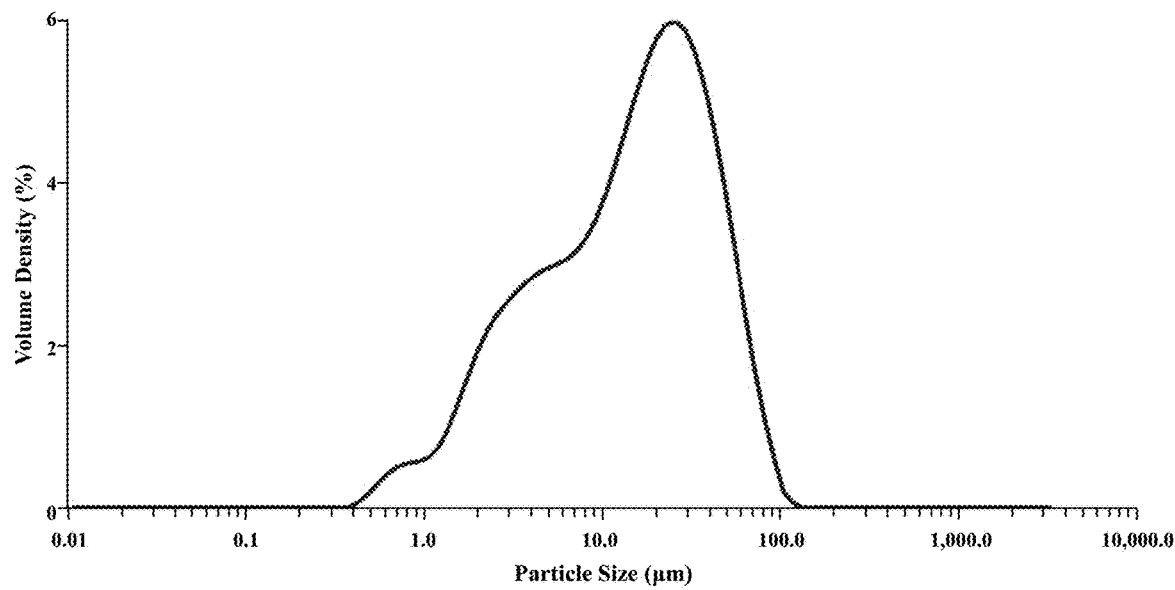
FIG. 1 represents a particle size distribution (A and B) of two inorganic mineral blends, each in accordance with the present disclosure.
Figure 1:
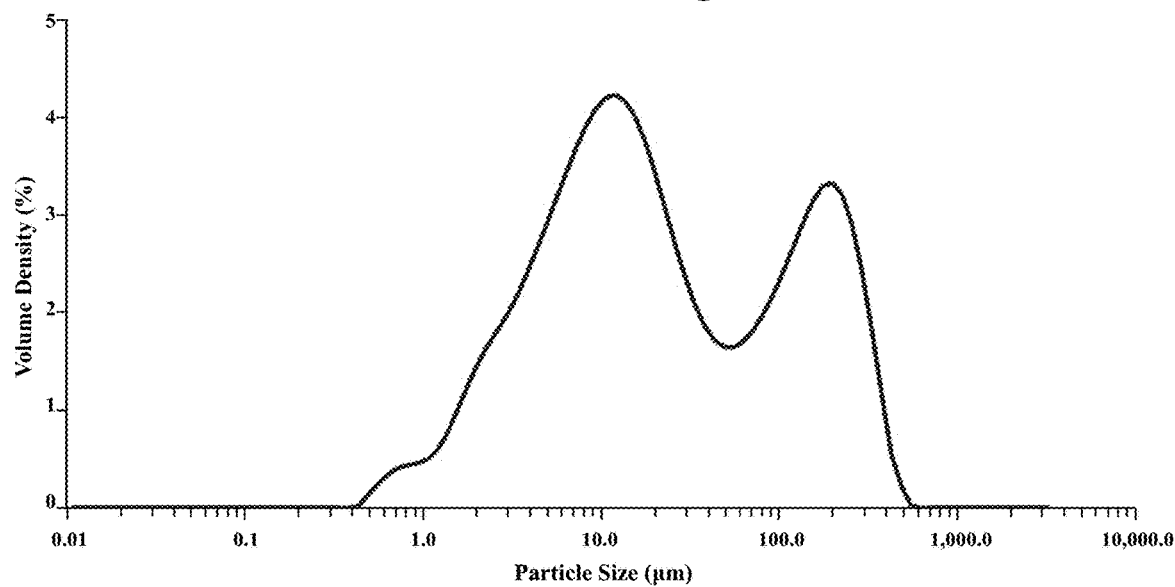

It should be understood, that for the purposes of the present disclosure, the following terms have the following meaning:

"Slurry seal" refers to a composition comprising a mixture of water, asphalt emulsion, and aggregate, and which is applied to an existing asphalt surface.

"Asphalt emulsion binder" or "asphalt binder" in the meaning of the present disclosure refers to a highly viscous liquid or semi-solid form of the fossil fuels petroleum and/or coal. "Asphalt binder" is defined by ASTM as a dark brown to black cement-like residuum obtained from the distillation of suitable crude oils, and is primarily used for road surfacing and roofing. The terms "asphalt binder," "asphalt emulsion binder," "binder," and sometimes "bitumen," may be used interchangeably by those skilled in the art and may refer to both natural and manufactured binder materials.

"Asphalt" refers to a mixture of binder and aggregate, and optionally other suitable components. The term "asphalt mix" may be used interchangeably with the term "asphalt."

"Natural ground calcium carbonate" (GCC) in the meaning of the present disclosure is a naturally occurring form of calcium carbonate, mined from sedimentary rocks, such as limestone or chalk, or from metamorphic marble rocks and processed through a treatment such as grinding, screening and/or fractionizing in wet and/or dry form. A non-limiting example of such treatment may be by a cyclone or a classifier.

"Precipitated calcium carbonate" (PCC) in the meaning of the present disclosure is a synthesized material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2,447,213 A1; EP 2,524,898 A1; EP 2,371,766 A1; EP 1,712,597 A1; EP 1,712,523 A1; and WO 2013/142473 A1.

"Surface treated" particles refers to a mineral filler material which has been contacted with a surface treatment agent such as to obtain a treatment layer located on at least a part of the surface of the mineral filler material. Accordingly, the term "treatment layer" refers to a layer comprising the surface treatment agent and/or reaction products thereof on at least a part of the surface of the mineral filler material.

The "particle size" of particulate materials is described by its volume-based distribution of particle sizes $d_x$. Therein, the value $d_x$ represents the diameter relative to which x % by volume of the particles have diameters less than $d_x$. This means that, for example, the $d_{20}$ value is the particle size at which 20 vol. % of all particles are smaller than that particle size. The $d_{50}$ value is thus the volume median particle size, i.e., 50 vol. % of all particles are smaller than this particle size. For the purpose of the present disclosure, the particle size is specified as volume median particle size $d_{50}$ (vol) unless indicated otherwise.

The "specific surface area" (expressed in $m^2/g$) of a material as used throughout the present document can be determined by the Brunauer Emmett Teller (BET) method. The method is well known by persons having ordinary skill in the art and is defined in ISO 9277:2010. The total surface area (in $m^2$) of said material can be obtained by multiplication of the specific surface area (in $m^2/g$) and the mass (in g) of the material.

"Viscosity" refers to Stormer viscosity.

"Suspension" or "slurry" comprises undissolved solids in an aqueous medium, and optionally further additives, and usually contains large amounts of solids and, thus, is more viscous and can be of higher density than the aqueous medium supporting the suspension.

"Dry" material (e.g., dry calcium carbonate) may be defined by its total moisture content which, unless specified otherwise, is less than or equal to 1.0 wt. %, more preferably less than or equal to 0.5 wt. %, even more preferably less than or equal to 0.2 wt. %, and most preferably from about 0.03 wt. % to about 0.07 wt. %, based on the total weight of the dried material.

In the following, the preferred embodiments of the inventive composition will be set out in more detail. It is to be understood that these technical details and embodiments also apply to all of the inventive products and processes.

An asphalt slurry seal is provided with improved durability and color characteristics. The asphalt slurry seal generally comprises an inorganic mineral filler ("mineral filler"), an asphalt emulsion, a pigment component, and an additive component.

In accordance with this disclosure, the mineral filler comprises at least an inorganic mineral blend, wherein the inorganic mineral blend comprises at least one small specific surface area (SSA) inorganic mineral and has a multi-modal particle size distribution. Optionally, the mineral filler further comprises one or more additional functional minerals known in the art. As used herein, the term "functional fillers" refers to all constituents in the asphalt slurry seal with the exception of the asphalt emulsion and water (e.g., the inorganic mineral blend, pigment component, additive component, and any optional functional minerals).

Functional Fillers

The inorganic mineral blend is characterized both by its multi-modal particle size distribution and small specific surface area. As used herein, the term "multi-modal" is intended to encompass bi-modal, tri-modal, and/or higher order modalities. Modality refers to the concentration, or frequency, of particles with a specific particle size, wherein a mode (or peak) of the frequency distribution represents the particle size most commonly found in the distribution. As used herein, a "mode" can be identified by a zero or a near-zero first derivative of the particle size distribution. For example, in certain embodiments, depending on the method being used to express particle size distribution, one of ordinary skill in the art will recognize that a mode may be represented by a "peak". The terms "peak" and "mode" are sometimes used interchangeably in the art, although one of skill in the art would understand that a mode may also be represented by something other than a peak and still fall within the scope of this disclosure. In one non-limiting example, modality may be seen by reference to particle size distribution plots, i.e., volume density % vs. diameter (e.g. FIG. 1, an inorganic blend). Such plots may reveal a multimodal distribution to one skilled in the art by the expression of at least two distinguishable components. Such components may be distinguished, for example, by the expression of one or more zero or near-zero first derivatives, and/or by the presence of more than one inflection point, indicating a change in slope of the plot. Alternatively, in a different non-limiting example, modality may be determined by the number of local maxima, wherein a local maximum refers to a point on a particle size distribution graph where the slope of a tangent to the curve is zero. For purposes of this disclosure, the term "maxima" or "maximum" refers to any distinguishable mode, whether expressed by a distinct peak or local maximum (e.g. zero first derivative), a change in slope or near zero first derivative, or other methods known by those skilled in the art for distinguishing modes in a particle size distribution.

In embodiments herein, the inorganic mineral blend may have a multi-modal particle size distribution comprising at least a first maximum and at least a second maximum such that the second maximum is greater than the first maximum. In certain examples, the first maximum will be in the range of about 0.1 µm to about 15 µm, 0.1 µm to about 5 µm, 0.3 µm to about 10 µm, 0.5 µm to about 12 µm, and including all values, ranges, and subranges therein. The second maximum will be in the range of 5 µm to about 35 µm, 17 km to 35 µm, 20 µm to 35 µm, 10 µm to 30 µm, 15 µm to 20 µm, and including all values, ranges, and subranges therein. By way of example only, in one embodiment, the mineral filler is comprised of an inorganic mineral blend having a multi-modal particle size distribution comprising at least a first maximum in the range of about 0.1 µm to about 15 µm, and a second maximum in the range of about 5 µm to about 35 µm, including all values, ranges, and subranges therein. In another embodiment, the first maximum is in the range of about 1 µm to 5 µm and the second maximum is in the range of about 15 µm to about 35 µm.

Figure 2:
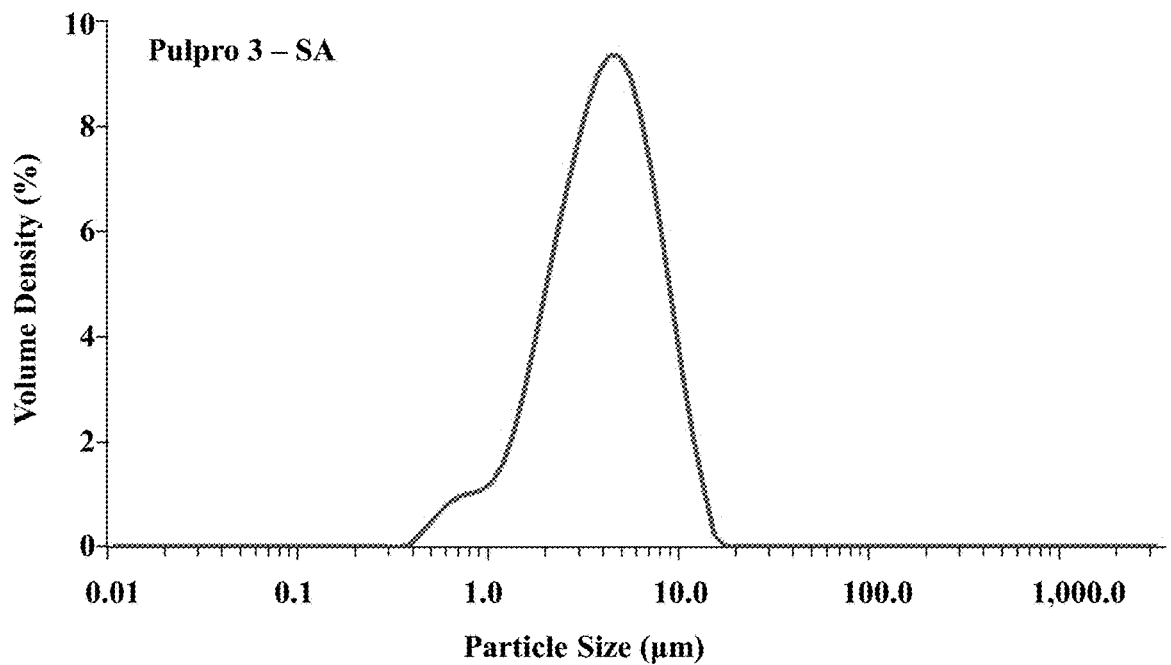
FIG. 2 represents a particle size distribution (A and B) of two inorganic mineral components with distinct particle size distribution modes.
Figure 2:
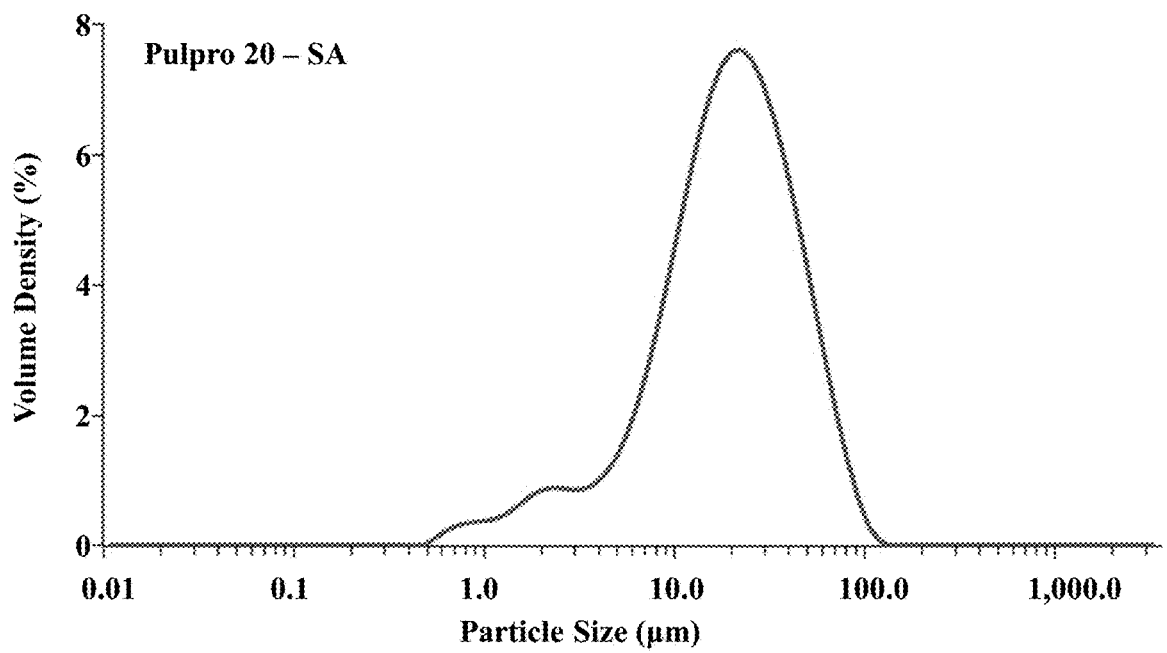
Figure 3:
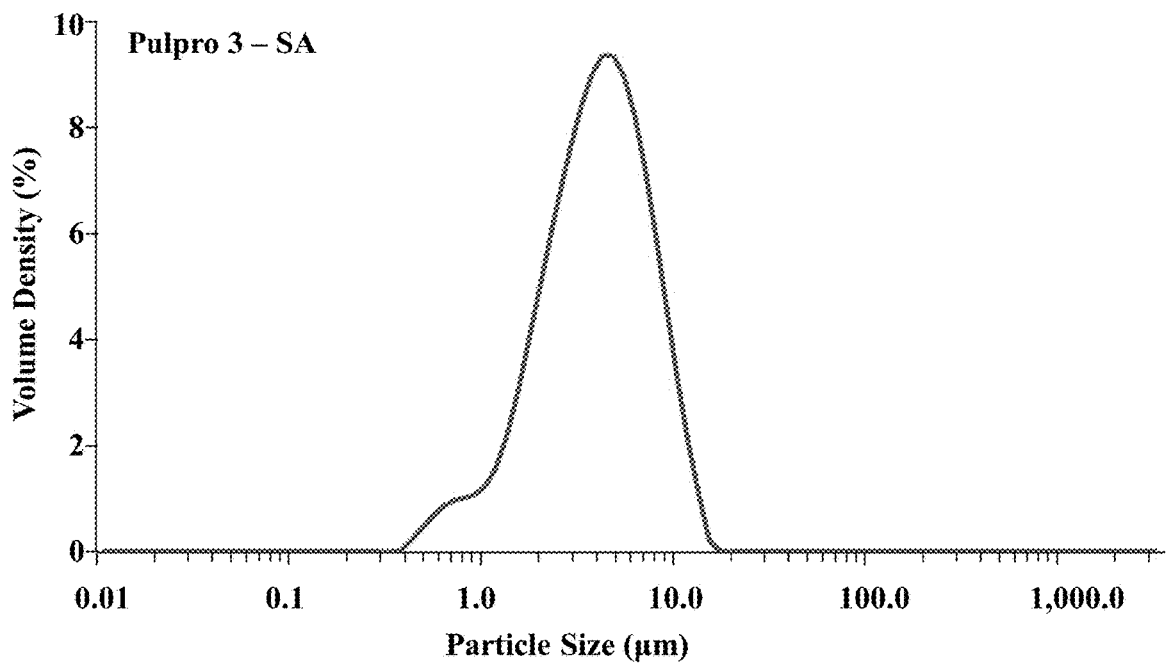
FIG. 3 represents a particle size distribution (A and B) of two inorganic mineral components with distinct particle size distribution modes.
Figure 3:
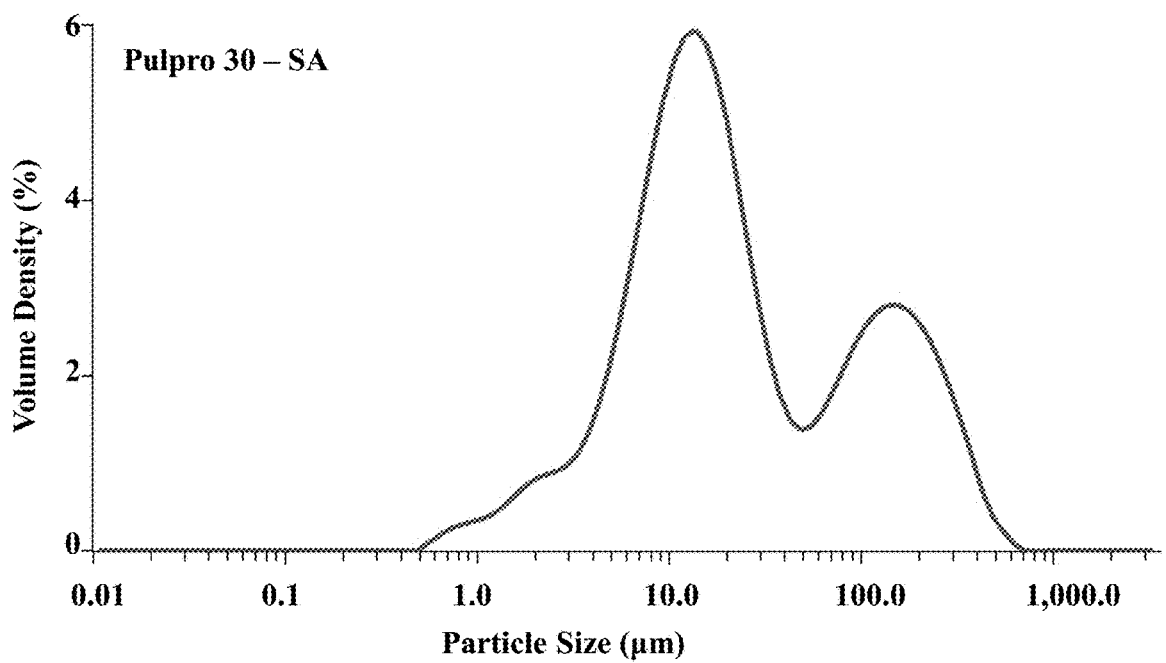

One of ordinary skill in the art will recognize that a multi-modal particle size distribution may be obtained by a variety of methods and/or mechanisms. For example, particles of different distribution curves may be used, or particles of the same material subjected to different processing may be used. By way of further example, particles of one inorganic mineral may have a different particle size distribution than particles of another inorganic mineral, such that a resulting particle size distribution curve for the mixture has a first mode and a different second mode, or even a third mode, or more. Although not required or meant to be limiting, according to some embodiments a method of making a bi-modal inorganic mineral blend may include providing a first inorganic mineral having a first particle size distribution, providing a second inorganic mineral having a second particle size distribution, and blending the first and second inorganic minerals to form the inorganic mineral blend, wherein the second particle size distribution has a $d_{50}$ greater than the first particle size distribution. By way of example, see FIG. 2 and FIG. 3, illustrating non-limiting examples of two inorganic minerals expressing distinct particle size distribution modes or peaks prior to blending to form an inorganic mineral blend in accordance with the present disclosure.

It is appreciated that in the particle size distribution, each mode may have a different number (volume density %) of particles. Thus, in a multi-modal particle size distribution, the number of particles of a first mode may be substantially less than or greater than the number of particles of a second mode. In some embodiments, the relative weight of the particles defining a mode within the particle size distribution may be equalized. In another embodiment, the relative number of particles defining a mode within a particle size distribution may be equalized. It is further appreciated that the size of the particles in each mode may be proximal to each other or spread from each other, such that if multiple modes are blended together, the presence of multiple modes may not be distinctly expressed in the particle size distribution of the blended inorganic mineral filler and/or the composite. In this case, the presence of multiple distinct modes (e.g. a first maximum, second maximum, and/or further maximum) in the inorganic mineral components prior to blending is intended to fall within the scope of this disclosure, regardless of whether one skilled in the art would otherwise recognize the presence or expression of multiple modes in the final blend.

Optionally, it is contemplated that the inorganic mineral blend may also comprise coarser particles with larger particle sizes. For example, coarser particle sizes may be added to enhance one or more of a desired texture and/or surface roughness. In certain embodiments, the particle size distribution of the inorganic mineral blend comprises at least a further maximum within a particle size range of about 0.1 µm to about 1 mm. It is appreciated that the at least a further maximum may be in any range or subrange therein (e.g., about 20 µm to about 40 µm, about 20 µm to about 300 µm, about 20 µm to about 1 mm, etc.), provided it reveals one or more modes separate and distinct from the first and second maxima. By way of example only, in one embodiment, the first maximum is in the range of about 0.1 µm to about 5 µm, the second maximum is in the range of about 5 µm to about 20 µm, and the at least one further maximum is in the range of about 20 µm to about 300 µm. In another embodiment, the first maximum is in the range of about 0.1 µm to about 4 µm, the second maximum is in the range of about 5 µm to about 20 µm, and the at least one further maximum is in the range of about 25 µm to about 35 µm.

In embodiments herein, the inorganic mineral particles within a first distribution represented by the first maximum (e.g., with the particle size range of about 0.1 µm to about 15 µm) comprise about at least 5 wt. %, about at least 10 wt. %, about 10 wt. % to about 30 wt. %, about 15 wt. % to about 30 wt. %, about 15 wt. % to about 25 wt. %, or equal to or less than about 40 wt. %, of particles in the inorganic mineral blend (dry weight), and all values, ranges, and subranges therein.

In embodiments herein, the inorganic mineral particles within one or more distributions represented by the second maximum (and any higher maxima) comprise equal to or greater than about 60 wt. %, for example about 60 wt. % to about 95 wt. %, of the particles in the inorganic mineral blend (dry weight), and all values, ranges, and subranges therein.

The multi-modal inorganic mineral blend comprises inorganic mineral blend particles with a small specific surface area (SSA). In one exemplary embodiment, the inorganic mineral blend comprises at least one inorganic mineral, wherein the at least one inorganic mineral is a small specific surface area (SSA) mineral, or any combination thereof. In other embodiments, the inorganic mineral blend comprises two or more inorganic minerals, wherein each inorganic mineral is a small specific surface area (SSA) mineral. For the purposes of the present disclosure, a small specific surface area (SSA) mineral is a mineral with a BET SSA of less than or equal to 15 $m^2/g$. In certain embodiments, a non-limiting example is an inorganic SSA mineral with a BET SSA of about 4.5 $m^2/g$.

The ability to achieve reduced interfacial surface area by incorporating a distinctive, smaller particle size distribution within the multi-modal inorganic filler mineral is believed to be, at least in part, one basis for the improvement in durability of the asphalt sealer comprising the present composition. For example, with respect to durability, an inorganic mineral filler with less interfacial surface area means that less asphalt emulsion binder (i.e., bitumen) will be required to cover the surface of the mineral filler. And, because less binder is tied up with the mineral filler, more binder is available and used for adhesion, which leads to improved durability. While those skilled in the art will recognize that coarse particle sizes are necessary to some degree in an asphalt slurry seal to achieve certain characteristics (e.g., roughness, traction), the smaller particle size distribution for the small SSA inorganic mineral, as disclosed herein, results in a lower interfacial surface area (reduced surface area affects) which in turn allows for increased bitumen where it is needed most, as compared to similarly-sized alternative minerals (e.g. clay, kaolin).

The ability to achieve enhanced color and durability characteristics, as further discussed herein (see, e.g., FIGS. 4-5), is also attributable to the presence of the smaller (finer) particle size and its corresponding settling behavior within the layers of the asphalt sealer when applied.

Additionally, in certain embodiments as discussed herein, the inorganic filler mineral particles are surface treated to further reduce surface area affects, which in turn enhances the desired durability and color characteristics of the asphalt sealer in multiple ways. By way of example, and in accordance with certain embodiments herein, surface treatment of at least a portion of the inorganic filler mineral particles increases durability, and/or enhances color and flexibility attributes, in the asphalt sealer when applied to a surface. For example, surface treatment of a portion of the inorganic mineral particles can further reduce interfacial surface area in the upper most layers of the asphalt sealer, when applied to a surface, thus increasing the amount of carbon black in the upper most layers (e.g., surface layers of sealer when applied), which in turn will result in reduced ultraviolet (UV) damage to the asphalt binder and/or pigment component, thus improving color characteristics. Surface treatment may also be utilized to provide for increased bitumen in the top layer area of the asphalt sealer coating, when applied, where it is needed most to improve durability.

In accordance with the disclosure herein, the inorganic mineral blend particles will have at least a first and second maximum, thus providing a multimodal particle size distribution. In certain embodiments, the inorganic mineral blend particles with the first maximum will have a BET specific surface area in the range of about 4 $m^2/g$ to about 15 $m^2/g$, and all values, ranges, and subranges therein. For example, the inorganic mineral blend particles with the first maximum (e.g., in the range of 0.1 µm to about 15 µm) may have a BET specific surface area in the range of about 4.5 $m^2/g$ to about 6 $m^2/g$, or in the range of about 4.0 $m^2/g$ to about 5 $m^2/g$, or in the range 4 $m^2/g$ to about 8 $m^2/g$, or in the range of about 5.0 to about 7.5 $m^2/g$. In still other embodiments, the inorganic mineral blend particles with the first maximum have a BET specific surface area of less than about 8 $m^2/g$, less than about 7.5 $m^2/g$, less than about 7 $m^2/g$, less than about 6.5 $m^2/g$, less than about 6 $m^2/g$, less than about 5.5 $m^2/g$, less than about 5 $m^2/g$, or less than about 4.5 $m^2/g$, and all values, ranges, and subranges therein.

In certain embodiments, the inorganic mineral blend particles with the second maximum (e.g., in the range of about 5 µm to about 35 µm) have a BET specific surface area in the range of about 0.2 $m^2/g$ to about 1 $m^2/g$, and all values, ranges, and subranges therein. For example, the inorganic mineral blend particles with the second maximum may have a BET specific surface area in the range of about 0.4 $m^2/g$ to about 0.6 $m^2/g$, or in the range of about 0.6 $m^2/g$ to about 0.8 $m^2/g$, or in the range of about 0.7 $m^2/g$ to about 1.0 $m^2/g$. In still other embodiments, the inorganic mineral blend particles with the second maximum have a BET specific surface area of less than about 1 $m^2/g$, less than about 0.9 $m^2/g$, less than about 0.8 $m^2/g$, less than about 0.7 $m^2/g$, less than about 0.6 $m^2/g$, less than about 0.5 $m^2/g$, or less than about 0.45 $m^2/g$.

By way of example only, in one embodiment, the inorganic mineral blend particles with the first maximum have a BET specific surface area of less than about 8.0 $m^2/g$ and the inorganic mineral blend particles with the second maximum have a BET specific surface area of less than about 0.8 $m^2/g$. In yet another embodiment, the inorganic mineral blend particles with the first maximum have BET specific surface area of less than about 4.5 $m^2/g$ and the inorganic mineral blend particles with the second maximum have a BET specific surface area of less than about 0.6 $m^2/g$.

It will be appreciated that in certain embodiments herein the multi-modal inorganic mineral blend, as a whole, has a combined BET specific surface area in the range of about 0.7 $m^2/g$ to about 6 $m^2/g$, in others in the range of about 0.7 $m^2/g$ to about 3 $m^2/g$, etc., and all values, ranges, and subranges therein. In other embodiments, the multi-modal inorganic mineral blend has a combined BET specific surface area of less than about 6 $m^2/g$, less than about 5.5 $m^2/g$, less than about 5 $m^2/g$, less than about 4.5 $m^2/g$, less than about 4 $m^2/g$, less than about 3.5 $m^2/g$, less than about 3 $m^2/g$, less than 1 $m^2/g$, and all values, ranges, and subranges therein.

In embodiments herein, the small SSA inorganic mineral is an alkaline earth metal carbonate, preferably a calcium carbonate and most preferably ground calcium carbonate. In other embodiments, the small SSA inorganic mineral is selected from the group consisting essentially of natural calcium carbonate or ground calcium carbonate, calcium carbonate-comprising mineral material, barite (a.k.a. baryte), dolomite, and mixtures of the foregoing. Non-limiting examples of other known small surface area minerals include polymer beads, glass powder, sand, silicates, perlite, and aluminosilocates. It is appreciated that any suitable small SSA mineral known by persons having ordinary skill in the art may be used. In some embodiments, the at least one inorganic mineral is selected from the group consisting essentially of calcium carbonate, barite, dolomite, perlite, natural glass, synthetic glass (e.g., fumed silica, microspheres), and combinations thereof.

Although not meant to be limiting, in the specific embodiments disclosed herein the small SSA inorganic mineral is a calcium carbonate-containing inorganic mineral and/or comprises calcium carbonate. Although the embodiments herein may be discussed in terms of calcium carbonate, it is understood that the inorganic mineral blend may also comprise one or more small SSA inorganic minerals, such as those identified above. For example, in yet another embodiment, the small SSA inorganic mineral comprises barite. It is appreciated that barite may be comprised of barium sulfate. It is further appreciated that barite may be any barite suitable for the application described herein, including but not limited to, fine barite, ultrafine barite, micronized barite, API drilling grade barites, etc.

In certain exemplary embodiments, the small SSA inorganic mineral blend comprises a first inorganic mineral and/or a second inorganic mineral, thereby establishing a multi-modal blend. The first inorganic mineral is an inorganic mineral characterized by a small specific surface area and may be selected from the group consisting of calcium carbonate, barite, slate, kaolin, sand, and combinations thereof. The second inorganic mineral is an inorganic mineral characterized by a small specific surface area and may be selected from the group consisting of calcium carbonate, barite, slate, kaolin, sand, and combinations thereof. In accordance with embodiments herein, the first and second inorganic minerals may be the same inorganic mineral with different particle size distributions and/or different inorganic minerals with different particle size distributions and may be chosen independent from one another.

In embodiments wherein the small SSA inorganic mineral blend comprises first and/or second inorganic minerals, the first inorganic mineral is present in an amount from about 10 wt. % to about 35 wt. %, calculated based on the asphalt slurry seal, including any and all values, ranges, and subranges therein (e.g., about 15 wt. % to about 32 wt. %, about 15 wt. % to about 25 wt. %, about 10 wt. % to about 20 wt. %, etc.). The second inorganic mineral is present in an amount less than about 15 wt. %, and/or from about 0 wt. % to about 15 wt. %, calculated based on the asphalt slurry seal, including any and all values, ranges, and subranges therein (e.g., about 1 wt. % to about 12 wt. %, about 3 wt. % to about 11 wt. %, about 5 wt. % to about 10 wt. %, etc.).

By way of example only, in one exemplary embodiment, the first inorganic mineral is present in an amount from about 15 wt. % to about 25 wt. % and the second inorganic mineral is present in an amount from about 5 wt. % to about 10 wt. %.

In accordance with certain other embodiments, the small SSA inorganic mineral blend comprises only one inorganic mineral characterized independently by a multi-modal particle size distribution. In these embodiments, the inorganic mineral has two or more distinct particle size distributions (represented by two or more modes or peaks), thus constituting a multimodal inorganic mineral blend in accordance with this disclosure. In certain embodiments, the inorganic mineral blend particles within the distribution represented by the first maximum (e.g., in the range of 0.1 μm to about 15 μm) are present in an amount from about 10 wt. % to about 35 wt. %, calculated based on the asphalt slurry seal, including any and all ranges and subranges therein (e.g., about 15 wt. % to about 32 wt. %, about 15 wt. % to about 25 wt. %, etc.); and the inorganic mineral blend particles within the distribution represented by the second maximum (e.g., in the range of 5 μm to about 35 μm) are present in an amount from about 0 wt. % to about 15 wt. %, calculated based on the asphalt slurry seal, including any and all ranges and subranges therein (e.g., about 3 wt. % to about 11 wt. %, about 5 wt. % to about 10 wt. %, etc.).

It is further contemplated that in still other embodiments, the inorganic mineral blend may comprise one, two, or more small SSA inorganic minerals, and each small SSA inorganic mineral may have one, two, or more maxima.

In one embodiment, at least a portion of the inorganic mineral blend particles are treated with a surface treatment material. In another embodiment, the first inorganic mineral and the second inorganic mineral are treated with a surface treatment material. In yet another embodiment, the first inorganic mineral or the second inorganic mineral is treated with a surface treatment material.

In such embodiments, the portion of the inorganic mineral blend particles that are surface treated will affect the settling behavior of the particles comprising the asphalt slurry seal when the slurry is applied to a substrate and allowed to dry. More specifically, the surface treated particles will affect the composition of the uppermost layer of the applied asphalt slurry seal, which in turn will also affect the settling of particles in the lower layers due to layer differentiation.

In one embodiment, the surface treatment material comprises a hydrophobic agent, a fatty acid, a mono-substituted succinic anhydride, or a mono-substituted succinic acid. In another embodiment, the surface treatment material comprises at least one hydrophobic agent selected from the group consisting essentially of stearic acid, palmitic acid, alkyl succinic anhydride, and combinations thereof. It is appreciated that any suitable hydrophobic agent known by persons having ordinary skill in the art, and combinations thereof, may be used. In yet another embodiment, the surface treatment material is a combination of stearic acid and palmitic acid. Further details regarding said surface treatment agents and methods for preparing surface treated calcium carbonate products thereof are described in WO 2014/060286 A1 and WO 2014/128087 A1.

In addition to the mineral blend, the functional fillers of the asphalt slurry seal comprise a pigment component, wherein the pigment component comprises at least one pigment. The pigment, for example, may be carbon black and/or at least one of, a mineral colorant, an organic colorant, a UV stabilizer, or combinations thereof.

In one exemplary embodiment, the pigment is carbon black. In certain embodiments, the carbon black has a specific surface area in the range of about 29 $m^2/g$ to about 1350 $m^2/g$, or more specifically, from about 29.4 $m^2/g$ to about 1337 $m^2/g$, from about 70 $m^2/g$ to about 100 $m^2/g$, and including any and all values, ranges, and subranges therein. For example, in certain examples recited herein, the carbon black has an SSA of about 77 $m^2/g$. The carbon black is present in an amount of about 0 wt. % to about 2.5 wt. %, calculated based on the asphalt slurry seal, including any and all values, ranges, and subranges therein (e.g., about 0 wt. % to about 2.0 wt. %, about 0.5 wt. % to about 1.5 wt. %, about 0.5 wt. % to about 1.0 wt. %, etc.). In one exemplary embodiment, carbon black is present in an amount of about 0.5 wt. % to about 1.1 wt. %. It is appreciated that carbon black may be any commercially available carbon black suitable for the application described herein, including but not limited to, N-330, Black Pearls (Cabot), etc. Although various types of carbon black (or other pigments) may be used, it is contemplated that different types of carbon black have different characteristics, such as particle size and BET specific surface area values, which can impact the wet track abrasion (i.e., durability) and/or color of the asphalt slurry seal composition. Therefore, the amount and type of carbon black (and/or other pigments) may need to be considered and adjusted accordingly.

In addition to the mineral blend and pigment, the functional fillers of the asphalt slurry seal comprise an additive component, wherein the additive component comprises at least one rheology modifier. In embodiments contemplated herein, the additive component is present in an amount less than about 25 wt. %, less than about 20 wt. %, less than about 15 wt. %, less than about 10 wt. %, less than about 5 wt. %, or less than about 3 wt. %, calculated based on the asphalt slurry seal. In certain embodiments, the additive component is present in the range of about 3 wt. % to about 25 wt. %, calculated based on the asphalt slurry seal, and all values, ranges, and subranges therein.

In exemplary embodiments, the rheology modifier comprises bentonite. For example, in certain embodiments, bentonite is present in an amount of less than about 5 wt. %, less than about 4 wt. %, less than about 3 wt. %, less than about 2 wt. %, or less than about 1 wt. %, calculated based on the asphalt slurry seal.

In some embodiments, bentonite is present in an amount of about 0 wt. % to about 5 wt. %, calculated based on the asphalt slurry seal, including any and all values, ranges, and subranges therein (e.g., about 1 wt. % to about 3 wt. %, about 1 wt. % to about 2 wt. %, about 1.4 wt. % to about 1.9 wt. %, about 2 wt. % to about 3 et. %, etc.). It is appreciated that bentonite may be any sodium bentonite suitable for the application described herein, including but not limited to the commercially available GlassJet (Standard), Volclay, etc.

Although various types of bentonite (or other rheology modifiers) may be used, it is contemplated that different types of bentonite have different characteristics, such as particle size and BET specific surface area values, which can impact the wet track abrasion (i.e., durability) and/or color of the asphalt slurry seal composition. Therefore, the amount and type of bentonite or other rheology modifier may need to be considered and adjusted accordingly.

In one embodiment, the additive component may further comprise at least one of styrene butadiene rubber (SBR), polymer, biocide, or combinations thereof. In another embodiment, the additive component may further comprise a cutback solvent, lignosulfonic acid, or combinations thereof. It is appreciated that the polymers may be synthetic, such as styrene butadiene, styrene butadiene styrene three block ("SBS"), ethylene vinyl acetate, ethylene propylene copolymers, polyvinylchorlide ("PVC"), nylon, polysterene, polybutadiene, acrylate resins, flurorocarbone resins, phenolic resins, alkyd resins, polyesters, polyethylene (linear or crosslinked), epoxy terpolymer, polypropylene, and combinations of the above polymers. It is further appreciated that any appropriate synthetic polymer known by persons having ordinary skill in the art may be used.

The biocide may be any suitable biocide for use in the application described herein and known by persons having ordinary skill in the art. It is appreciated that persons skilled in the art would recognize that the biocide is important for longer shelf life. Additional additives may also be added to the asphalt slurry to perform specific functions, such as providing UV stability to reduce environmental gaining, adjusting viscosity, stabilizing the emulsion, and so forth. While within the scope of this disclosure, some additives may increase the cost of the asphalt slurry and/or reduce the durability. It is further appreciated that an increase in asphalt emulsion may directly offset such disadvantages, and that an increase in asphalt emulsion means an increase in weight percent, meaning more surface area may be covered with the product.

The functional fillers of the asphalt slurry seal optionally may comprise other functional inorganic minerals. For example, in certain embodiments the addition of functional minerals (e.g., sand, recycled glass) may enhance surface roughness, which may be desired to provide increased traction on paved roads. In another example, in certain embodiments the addition of functional minerals (e.g., kaolin and clay) may decrease surface roughness and promote a smoother surface. In one embodiment, the asphalt slurry seal comprises one or more functional minerals. In another embodiment, the one or more functional minerals are selected from the group consisting essentially of slate, sand, recycled glass, kaolin, clay, silicate, and combinations thereof.

By way of example only, in certain embodiments, the one or more functional minerals are present in an amount of less than about 20 wt. %, less than about 15 wt. %, less than about 10 wt. %, or less than about 5 wt. %, calculated based on the slurry, and all values, ranges, and subranges therein. In yet another embodiment, slate and/or sand is present in an amount of about 0 wt. % to about 15 wt. %, calculated based on the slurry, including any and all values, ranges, and subranges therein (e.g., about 6 wt. % to about 15 wt. %, about 6 wt. % to about 12 wt. %, etc.). In yet another embodiment, kaolin is present in an amount of about 0 wt. % to about 20 wt. %, calculated based on the slurry, including any and all values, ranges, and subranges therein (e.g., about 0 wt. % to about 15 wt. %, about 0 wt. % to about 10 wt. %, etc.). In an exemplary embodiment, the inorganic mineral blend is about 77 wt. % to about 92 wt. % of the total amount of functional fillers (e.g., inorganic mineral blend, pigment component, additive component, and functional minerals) in the asphalt slurry seal.

Asphalt Emulsion

The asphalt slurry seal further comprises an asphalt emulsion. As known in the art, the asphalt emulsion binder (or asphalt binder) may comprise saturates, aromatics, resins and/or asphaltenes. An asphalt binder can include, for example, bitumen. "Bitumen" refers to a class of black or dark-colored (solid, semisolid, or viscous) cementitious substances, natural or manufactured, composed principally of high molecular weight hydrocarbons, of which asphalts, tars, coal tar, pitches, and asphaltenes are typical. One of ordinary skill in the art will recognize that the asphalt binder may also comprise other petroleum or coal-based organics materials, for example, gilsonite, coal tar and/or tar, or a combination of bitumen and the aforementioned.

In one embodiment, the asphalt emulsion is any asphalt emulsion that meets the standards known by persons having ordinary skill in the art, such as those set forth in ASTM D977-05. In another embodiment, the asphalt emulsion is an SS or CSS emulsion. In yet another embodiment, the asphalt emulsion is selected from the group consisting essentially of CSS-1, CSS-1h, SS-1, SS-1h, and combinations thereof. The asphalt emulsion is comprised of asphalt, an emulsifying agent, and water, and may further comprise additional additives such as stabilizers, coating improvers, anti-strips, and/or break control agents. Any asphalt emulsion suitable for the purposes of the present disclosure may be used. In one preferred embodiment, the asphalt emulsion is slow-setting (SS) or cationic slow-setting (CSS), either of which may be mixed with fine aggregates.

In certain embodiments, the asphalt emulsion may be present in an amount of about 19 wt. % to about 45 wt. %, calculated based on the asphalt slurry seal, including any and all values, ranges, and subranges therein (e.g., about 19 wt. % to about 35 wt. %, about 19 wt. % to about 31 wt. %, about 25 wt. % to about 35 wt. %, about 25 wt. % to about 31 wt. %, about 26 wt. % to about 32 wt. %, about 28 to about 32 wt. %, about 29 to about 31 wt. %, etc.).

The asphalt emulsion comprises a surfactant and the surfactant is present in an amount from about 0 wt. % to about 2 wt. %, preferably from about 0.1 wt. % to about 1.5 wt. %, more preferably from about 0.1 wt. % to about 1 wt.

%, and most preferably from about 0.1 wt. % to about 0.5 wt. %, calculated based on the asphalt slurry seal. In certain embodiments, the surfactant is present in an amount of less than about 1.5 wt. %, less than about 1.3 wt. %, less than about 1.1 wt. %, less than about 0.9 wt. %, less than about 0.7 wt. %, less than about 0.5 wt. %, or less than about 0.3 wt. %. It is appreciated that an excess of surfactant may have a negative impact on the formulation and decrease durability of the asphalt slurry seal.

For example, in an exemplary embodiment wherein the inorganic mineral blend comprises calcium carbonate, the asphalt emulsion of the slurry comprises a surfactant in an amount less than about 1 wt. %, calculated based on the weight of the slurry, and said asphalt emulsion is stable at about pH 7 to about pH 13.

The surfactant may be an anionic surfactant (e.g., such asphalt emulsions are denoted as SS), and/or a cationic surfactant (e.g., such asphalt emulsions are denoted as CSS). It is appreciated that anionic surfactants have one or more negative formal charges on the molecules, wherein cationic surfactants have one or more positive formal charges on the molecules. Amines such as those described above are cationic if they are in the ammonium form due to sufficiently low pH (i.e., acidic conditions) or the fact that the nitrogen is attached to 4 carbon atoms. Nitrogen compounds such as amines or ammonium salts, amidoamines, imidazolines, imidoamines, imines, amidoamines, amides, imadazoles, imidazolene, and the like, are also cationic surfactants provided that the pH is sufficiently low, or the nitrogen is quaternary, meaning that it is attached to 4 non-hydrogen atoms. Amphoteric surfactants have either a positive or a negative formal charge depending on the pH of the composition, for example, sulfobetaines.

In embodiments disclosed herein, asphalt slurry seals comprising calcium carbonate may comprise any SS asphalt emulsion but may comprise CSS asphalt emulsions only when the surfactant is quaternary or stable under basic conditions. Asphalt slurry seals comprising barites may comprise either CSS or SS asphalt emulsions, regardless of pH. More specifically, an asphalt slurry seal in accordance with the disclosure herein may comprise a barite-containing inorganic filler and an asphalt emulsion stable at any pH.

As contemplated herein, in addition to the functional fillers and asphalt emulsion, the asphalt slurry seal further comprises an appropriate amount of water to form the slurry. In one embodiment, the asphalt slurry seal has a solids content of greater than about 35 wt. %, preferably of greater than about 40 wt. %, more preferably of greater than about 45 wt. %, and most preferably of greater than about 49 wt. %, calculated based on the asphalt slurry. It is appreciated that wt. % of solids content, calculated based on the asphalt slurry seal, can play a vital role in the overall viscosity of an asphalt slurry seal. Thus, weight percent is a crucial parameter to consider when balancing cost and viscosity. Asphalt slurry seals with a solids content weight percent below 35% often do not show significant enough thixotropic effects to be of any significant value to the overall viscosity of an asphalt sealer formulation.

In one embodiment, the asphalt sealer utilizes more solid material and less water to manage the viscosity of the final product. More solid material in the formulation per the same volume means that the asphalt sealer will cover a larger surface area.

In one embodiment, the asphalt slurry seal has a composite $d_{50}$ particle size of less than about 35 μm and a composite $d_{90}$ particle size in the range of about 180 μm to about 300 μm, wherein the particles in the range of about 180 to about 300 μm comprise about 8 wt. % to about 15 wt. %, based on the weight of the slurry. For the purposes of this application, the term "composite" as applied to a value is defined to mean a value derived from all functional fillers, (e.g., inorganic mineral blend, pigment, additive, and functional mineral) in the asphalt slurry seal.

In another embodiment, the asphalt slurry seal has a composite $d_{50}$ particle size of about 40 μm or less, preferably of about 35 μm or less, and more preferably of about 30 μm or less. It is appreciated that, asphalt slurry seals with a composite $d_{50}$ particle size of greater than about 35 μm tend to have systemic durability and emulsion stability issues, which worsen as $d_{50}$ particle size increases, relative to asphalt slurry seals with a composite $d_{50}$ of less than 35 μm. It is further appreciated that, to provide emulsion stability, it is ideal to keep the $d_{50}$ particle size to below 30 μm. Moreover, an asphalt slurry seal with a $d_{50}$ between 19 μm and 25 μm will have a smooth texture whereas an asphalt slurry seal with a $d_{50}$ between 35 μm and 60 μm will have a rough texture, typically due to the addition of sand or large particle sized slate. In addition, to confer roughness to the asphalt slurry seal, ideally the $d_{90}$ particle size is at least 180 μm to 300 μm and such particles are present at about 8 wt. % to about 15 wt. %, based on the asphalt slurry seal, including any and all values, ranges, and subranges therein (e.g., about 10 wt. % to about 14 wt. %, etc.).

In one embodiment, the asphalt slurry seal has a composite BET specific surface area of from about 0.7 to about 15.0 $m^2/g$, including any and all values, ranges, and subranges therein (e.g., about 0.7 $m^2/g$ to about 3 $m^2/g$, 0.7 $m^2/g$ to about 4.5 $m^2/g$, 0.7 $m^2/g$ to about 6 $m^2/g$, 2.9 $m^2/g$ to about 10.1 $m^2/g$, about 1.0 $m^2/g$ to about 6 $m^2/g$, about 2 $m^2/g$ to about 4.5 $m^2/g$, etc.). Although in certain embodiments disclosed herein, the composite BET will be in the range of 0.7 $m^2/g$ to about 3 $m^2/g$, it is appreciated that a comparison of commercial asphalt slurry seals shows that a composite BET specific surface area of less than about 4.5 $m^2/g$ would be appropriate to achieve commercially preferred for durability at the lowest possible cost while a composite BET specific surface area of about approximately 6 $m^2/g$ is adequate for achieving commercially acceptable durability at about the same cost.

In one embodiment, the asphalt slurry seal measured in a manner known in the art, e.g., according to ASTM D562-10, has a viscosity of about 40KU to about 120 KU, including any and all values, ranges, and subranges therein (e.g., about 40KU to about 70KU, about 70KU to about 100 KU, about 80KU to 90KU, about 85KU to about 110KU, etc.). The desired viscosity of the asphalt slurry seal is dependent on the application, for example, 80-90KU is preferable for a squeegee, 85-110KU is preferable for storage, and 40-70KU is preferable for a spray.

The asphalt slurry seal disclosed herein provides improved durability characteristics. In one embodiment, the asphalt slurry seal applied to a substrate and allowed to dry and measured in a manner known in the art, e.g., according to ASTM 3910-15, has a wet track abrasion of about 2 $g/ft^2$ to about 25 $g/ft^2$, including any and all values, ranges, and subranges therein (e.g., about 2 $g/ft^2$ to about 20 $g/ft^2$, about 2 $g/ft^2$ to about 15 $g/ft^2$, about 2 $g/ft^2$ to about 10 $g/ft^2$, etc.).

The asphalt slurry seal disclosed herein further provides improved and/or enhanced color characteristics. In certain embodiments, the asphalt slurry seal applied to a substrate, allowed to dry and prior to any weathering has a CIELAB L* (lightness) of less than about 24 units, less than about 20 units, less than about 15 units, or less than about 10 units. Further, in certain embodiments, the asphalt slurry seal has a CIELAB a* from about −0.2 to about 2.3, from about −0.2 to about 2.0, from about −0.2 to about 1.5, from about −0.2 to about 1.0, from about −0.2, to about 0.5, or from about −0.2 to about 0.2. Further, the asphalt slurry seal has a CIELAB b* from about 0 to about 6, including any and all values, ranges, and subranges therein (e.g., about 0 to about 5, about 1 to about 6, about 1 to about 5, about 1 to about 3, etc.). As used herein, CIELAB refers to CIELAB Color Space, or CIE L*a*b*, where the letters L*, a*, and b* represent each of the three values the CIELAB color space uses to measure objective color and calculate color differences. L* represents lightness from black to white on a scale of 0 to 100 units, and a* and b* represent chromaticity with no specific numeric limits. Negative a* corresponds with green, positive a* corresponds with red, negative b* corresponds with blue, and positive b* corresponds with yellow.

Furthermore, in one exemplary embodiment, the asphalt slurry seal applied to a substrate and allowed to dry has a first CIELAB L* (lightness) value obtained prior to an accelerated weather and a second CIELAB L* value obtained after the accelerated weather, wherein the second CIELAB L* (lightness) value is less than the first CIELAB L* value (e.g., the asphalt slurry seal becomes darker black in color over time). In certain embodiments, the CIELAB L* (lightness) value is improved (or reduced) after accelerated weathering by about 2-6 units. More specifically, accelerated weathering testing according to a modified ASTM G154 for the asphalt slurry disclosed herein (when applied to a substrate and allowed to dry) revealed enhanced color characteristics in that the asphalt sealer became a darker black color over time (decreased L*).

In certain embodiments disclosed herein, the asphalt slurry seal applied to a substrate has a CIELAB L* value less than a comparable asphalt slurry seal that does not comprise calcium carbonate (or similar inorganic mineral with minimized specific surface area). The enhanced darker black color exhibited by the asphalt slurry seal is directly related to the carbon black tint strength in the asphalt sealer. For example, in certain embodiments, when calcium carbonate is used as the small SSA inorganic mineral filler disclosed herein, the dark black color characteristics will be enhanced because calcium carbonate does not contribute significantly to the a* and b* CIELAB values, as compared to alternative minerals (e.g., kaolin or bentonite). In these and other embodiments, the dark black color characteristics also may be enhanced because the small SSA inorganic mineral within the first maximum particle size distribution will increase the carbon black particles (or other UV stabilizer) in the upper most layer of the asphalt sealer thus contributing to improved UV protection without otherwise negatively impacting desired durability (see Table 1 and FIG. 4).

Figure 4:
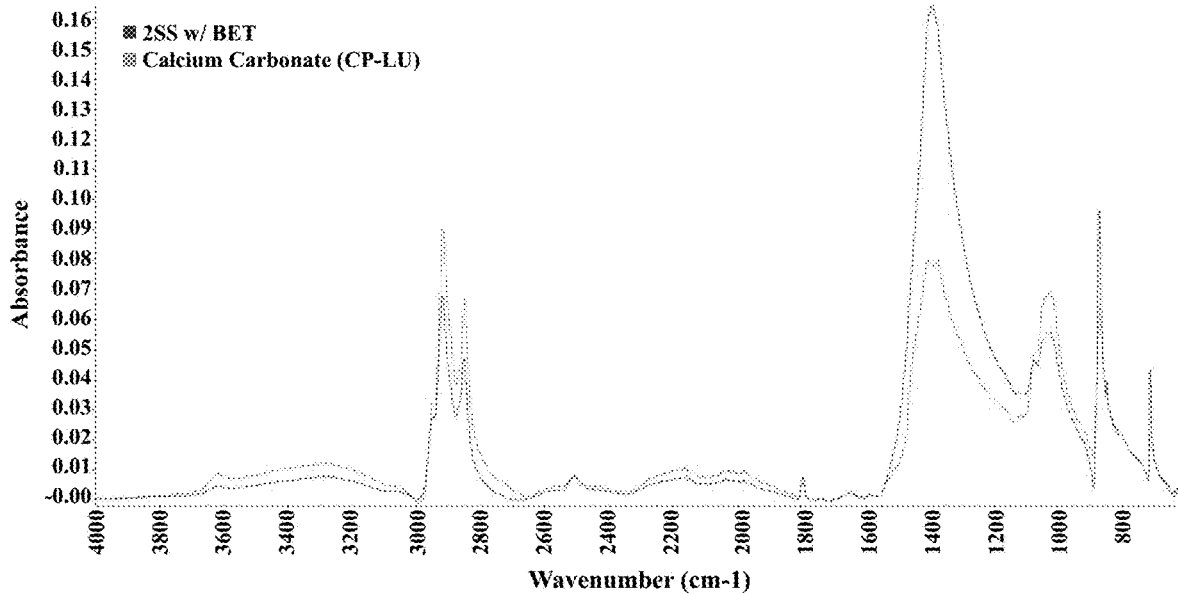
FIG. 4 is an illustrative spectrum from Attenuated Total Reflectance (ATR) Fourier Transform Infrared (FTIR) spectroscopy of select samples comprising a calcium carbonate inorganic mineral filler with different particle size distributions.
Figure 5:
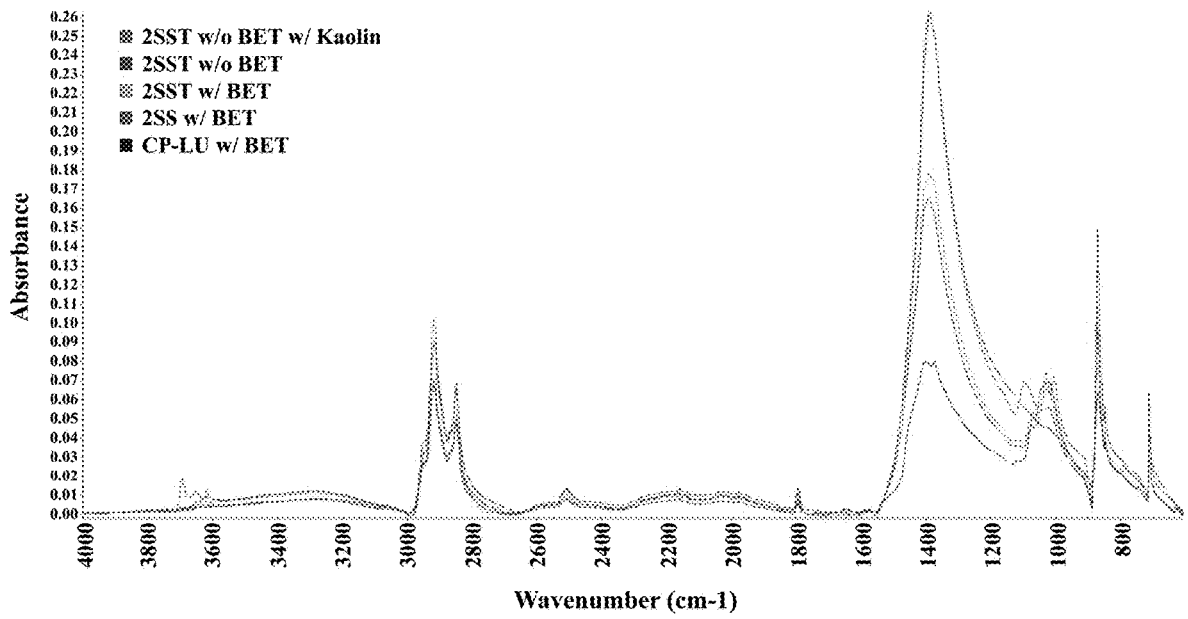
FIG. 5 is an illustrative spectrum from ATR-FTIR spectroscopy of select samples comprising a calcium carbonate inorganic mineral filler with bentonite, without bentonite, or without bentonite but with kaolin.

Additionally, referring to Tables 1 and 2 and FIG. 4 and FIG. 5, the small SSA inorganic mineral within the first maximum particle size distribution will increase the amount of available bitumen in the upper most layer (e.g., surface layer(s)), but will not otherwise negatively impact the desired durability, color, flexibility, and/or aesthetics characteristics of the asphalt sealer (as applied) as compared to asphalt sealers using alternative filler minerals such as kaolin or bentonite (see Table 2 and FIG. 5).

Referring to Table 1, ATR-FTIR data for samples comprising calcium carbonate, specifically Omyacarb CP-LU (commercially available from Omya International AG), and one of two carbon blacks, either Nobel carbon black (commercially available from Akzonobel) or Norit® carbon black (commercially available from Cabot Corporation). The samples comprise varying amounts of carbon black, indicated as a percentage of the composition. Table 1 shows the effect of calcium carbonate and carbon black on the available bitumen in the surface and durability (e.g., wet track abrasion). Further, a sample comprising Nobel carbon black results in more bitumen in the upper layer than a comparable sample comprising Norit® carbon black under comparable circumstances. All ATR-FTIR results are run using a Cary 660 Spectrometer from Agilent Technologies.

TABLE 1

Carbon Black Study; ATR-FTIR.

| | Wavenumbers & Peak Areas | | | Ratios | | | WTA Avg. |
|---|---|---|---|---|---|---|---|
| Sample | 715 cm$^{-1}$ | 1040 cm$^{-1}$ | 3000 cm$^{-1}$ | 1040/715 | 3000/1040 | 3000/715 | (g/ft$^2$) |
| CP-LU; Nobel 3% | 0.2524 | 3.695 | 7.099 | 14.6 | 1.9 | 28.1 | 12.6 |
| CP-LU; Norit 0% | 0.1919 | 2.6759 | 6.024 | 13.9 | 2.3 | 31.4 | 35.2 |
| CP-LU; Norit 3% | 0.2571 | 3.2106 | 6.029 | 12.5 | 1.9 | 23.5 | 36.4 |
| CP-LU; Norit 5% | 0.3378 | 3.6897 | 7.529 | 10.9 | 2.0 | 22.3 | 37.6 |
| CP-LU; Norit 10% | 0.1678 | 1.6801 | 8.051 | 10.0 | 4.8 | 48.0 | 18.6 |

Table 2 shows ATR-FTIR data from samples comprising calcium carbonate with bentonite (a.k.a. BET), without BET, or without BET but with kaolin.

TABLE 2

Calcium Carbonate Particle Size Study; ATR-FTIR (FIG. 5).

| | Wavenumbers & Peak Area | | | Ratios | | | WTA Avg. |
|---|---|---|---|---|---|---|---|
| Sample | 715 cm$^{-1}$ | 1040 cm$^{-1}$ | 3000 cm$^{-1}$ | 1040/715 | 3000/1040 | 3000/715 | (g/ft$^2$) |
| CP-LU w/BET | 0.2524 | 3.695 | 7.099 | 14.6 | 1.9 | 28.1 | 12.6 |
| 2SS w/BET (Ex. 8) | 0.3064 | 2.334 | 5.389 | 7.6 | 2.3 | 17.6 | 14.5 |
| 2SST w/BET (Ex. 7) | 0.3356 | 2.926 | 7.047 | 8.7 | 2.4 | 21.0 | 13.1 |
| 2SST w/o BET (Ex. 9) | 0.4633 | — | 5.534 | — | — | 11.9 | 11.9 |
| 2SST w//o BET w/Kaolin | 0.4701 | — | 7.973 | — | — | 17.0 | 15.7 |

Thus, in embodiments disclosed herein, the asphalt slurry seal applied to a substrate exhibits both increased available bitumen and increased carbon black in the uppermost or top surface layers after drying, as compared to comparable commercially available asphalts sealers, thus resulting in enhanced and/or comparable color characteristics and durability, both upon initial application (t=0) and over time without substantially increasing the cost.

This is further exemplified by reference to FIG. 6, FIG. 7, Table 10, and Table 11. FIG. 6 shows an asphalt slurry seal, without carbon black, applied to a substrate and subjected to accelerated weathering over time. As shown in FIG. 6, the asphalt slurry seal comprising the mineral filler, rheology modifier (bentonite), and asphalt emulsion, in accordance with this disclosure, but no carbon black, lightened and browned over time. More specifically, FIG. 6 depicts images of an applied asphalt slurry seal lacking carbon black that were captured along with CEILAB color measurements pursuant to ASTM D4799 method. The applied asphalt slurry at time zero ($t_0$), has an L* value of 22.66 and an L* value of 24.02 at $t_{1000}$, wherein $t_0$ refers to a time prior to accelerated weather testing, $t_{1000}$ refers to a time after which accelerated weather testing has occurred for 1000 hours, and L* is the CIELAB lightness value. As is seen in FIG. 6, the applied asphalt slurry seal (without carbon black) lightens and browns in color over time, which is consistent with L* increasing over time. See Table 10.

FIG. 7 shows an asphalt slurry seal in accordance with the present disclosure, with carbon black, applied to a substrate and subjected to accelerated weathering over time. As shown in FIG. 7, the asphalt slurry comprising the mineral filler, carbon black (pigment), rheology modifier (bentonite), and asphalt emulsion in accordance with this disclosure, will not lighten over time but will instead get blacker in color over time. Referring to FIG. 7, images of an applied asphalt slurry seal comprising carbon black were taken along with CEILAB color measurements pursuant to ASTM D4799 method. At time zero ($t_0$), the asphalt slurry seal (applied) had an L* value of 22.5 versus an L* value of 15.56 at $t_{1000}$, wherein $t_0$ refers to a time prior to accelerated weather testing, $t_{1000}$ refers to a time after which accelerated weather testing has occurred for 1000 hours, and L* is the CIELAB lightness (or "blackness") value. As is seen in FIG. 7, the applied asphalt slurry seal made in accordance with the disclosure herein darkens in color over time, which is consistent with L* decreasing over time. See Table 11.

In one embodiment, the asphalt slurry seal applied to a substrate and allowed to dry has a first L* value obtained prior to an accelerated weather and a second CIELAB L* value obtained after the accelerated weather, wherein the accelerated weather testing is performed according to a modified ASTM G154, and wherein the second CIELAB L* value is less than the first CIELAB L* value.

It therefore has surprisingly been discovered that the asphalt slurry seal as described herein, when applied and allowed to dry, is characterized by increased blackness (decrease in L* value) over time despite weathering.

Figure 8:
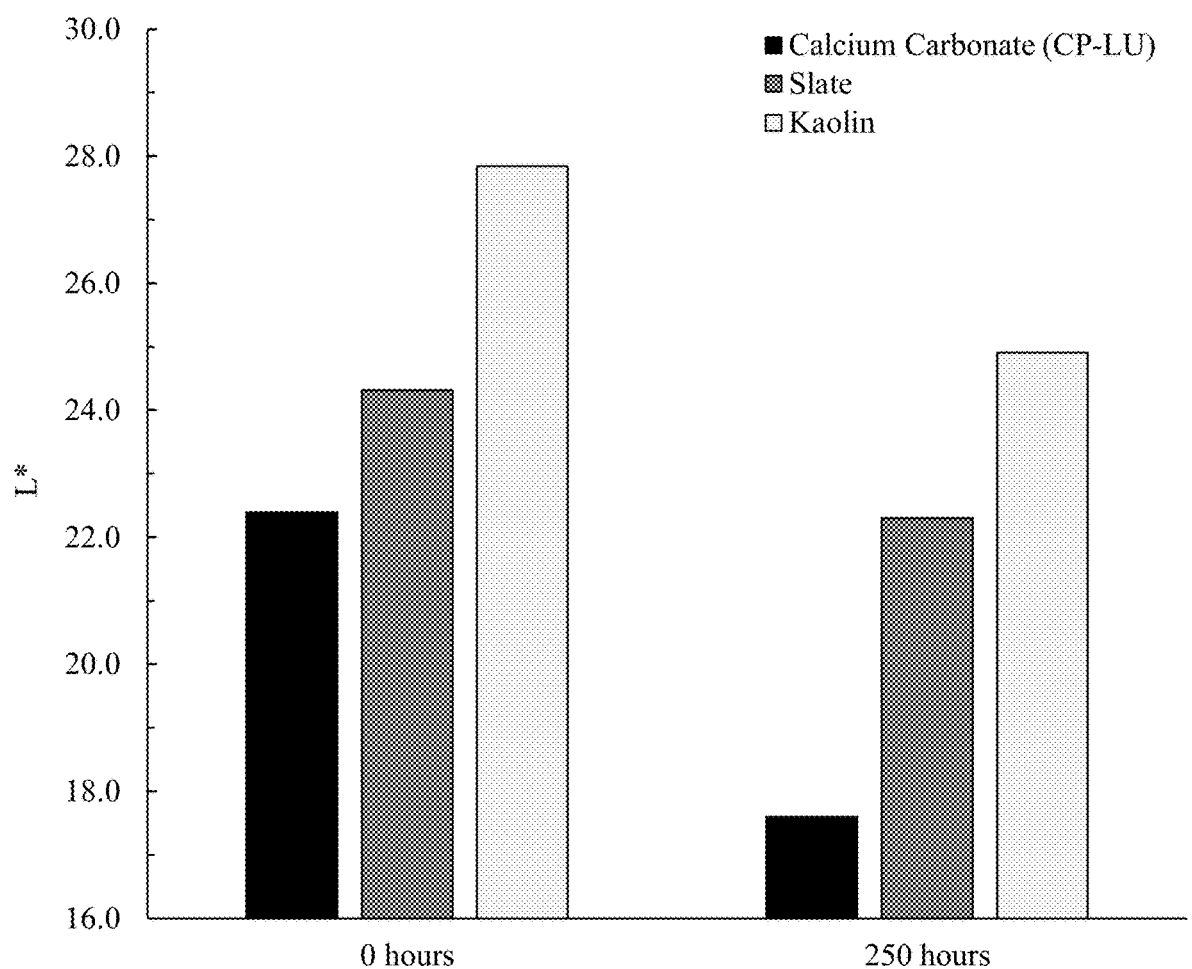
FIG. 8 is a bar graph depicting the CIELAB lightness value, L*, of comparable asphalt slurry seals comprising calcium carbonate, slate, or kaolin, at 0 hours and 250 hours throughout the course of accelerated weather testing.

This surprising result is further depicted and explained by reference to FIG. 8. FIG. 8 shows that an asphalt slurry seal comprising calcium carbonate applied to a substrate has an L* value (at $t_0$ and $t_{250}$) that is less than a comparable asphalt slurry seal, wherein the mineral filler does not comprise calcium carbonate or the calcium carbonate is fully replaced by an inorganic mineral blend outside the range of one of parameters a) to c), and wherein $t_{250}$ refers to a time after 250 hours of accelerated weather testing. As shown in FIG. 8, the darkness (L* value) of the asphalt slurry seal (due to carbon black pigments) is accentuated when the inorganic mineral blend comprises calcium carbonate. It is appreciated that calcium carbonate alone does not contribute to the CIELAB L*, a*, or b* values as much as other inorganic minerals, e.g., slate (quartz), sand (recycled glass), and kaolin (ball clay). Thus, asphalt slurry seals with calcium carbonate promote an overall darker, richer, black color relative to the other minerals, due at least in part to the geometry of calcium carbonate and its very white color, with little b* and a*, as exemplified by findings that increased calcium carbonate within the asphalt slurry does not significantly increase the L* value and/or impact the dark black color characteristics of the asphalt slurry seal.

FIG. 4 shows that the finer mineral filler particles in an asphalt composition (or an asphalt slurry seal applied to a substrate) settle in a top layer of the asphalt composition (or the dried asphalt slurry seal) whereas the larger mineral filler particles settle in lower layers. Specifically, FIG. 4 depicts the absorbance of an asphalt slurry seal comprising calcium carbonate with a $d_{50}$ particle size of about 20.7 μm and an asphalt slurry seal comprising calcium carbonate with a $d_{50}$ particle size of about 3.4 μm.

It is believed the dark black color of the asphalt slurry seal disclosed herein is directly related to the increased amount of carbon black in the uppermost layer of the dried asphalt slurry seal (see Table 2). Specifically, by removing platy and high interfacial surface area minerals (e.g., kaolin) from the uppermost layer and replacing them with lower interfacial surface area minerals (e.g., inorganic minerals, like calcium carbonate, with a $d_{50}$ in the range of about 0.1 μm to about 15 μm) such that the amount of available bitumen and carbon black is increased (see FIG. 5). As a result, the L* is decreased and b* changes are mitigated, even over time. It has also been discovered that the color enhancement is further increased when the particle size distribution ($d_{50}$) of the carbon black agglomerates is within the range of 0.1 μm to about 15 μm, and is less than or equal to the smallest particle size distribution mode in the inorganic mineral blend (i.e., the first maximum).

Figure 9:
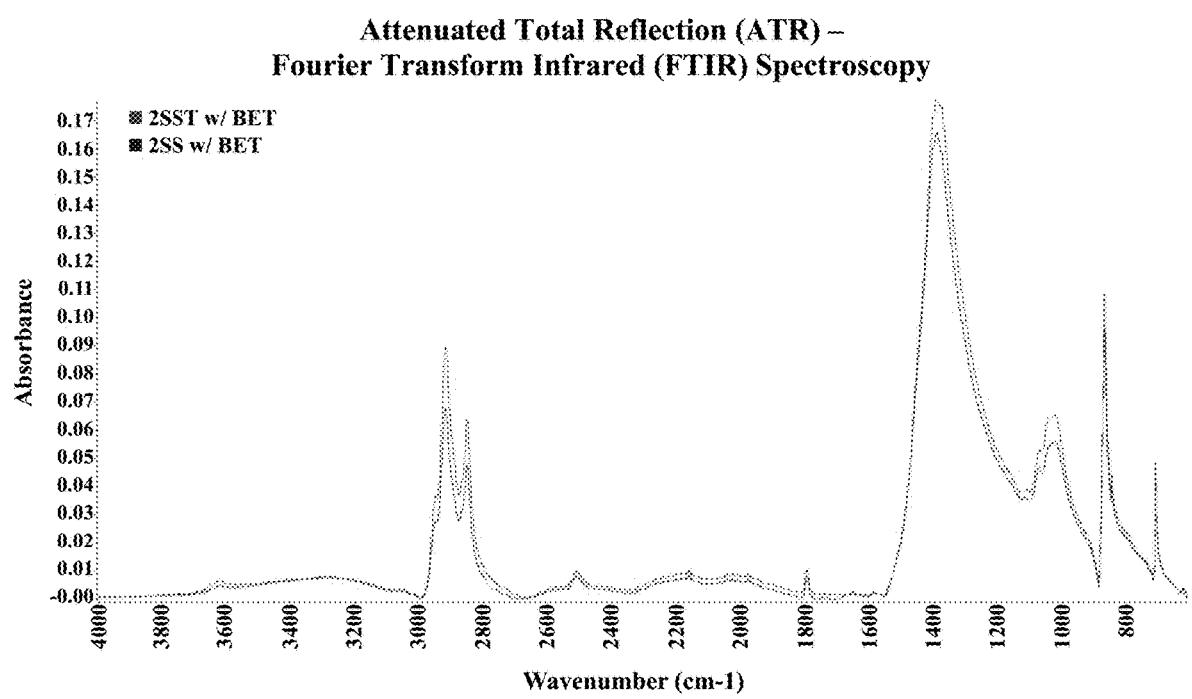
FIG. 9 is an illustrative spectrum from ATR-FTIR spectroscopy of select samples comprising treated and untreated calcium carbonates.

In embodiments herein, and referring by way of illustration to Tables 1-3 and FIG. 9, the asphalt sealer, as applied to a surface, can be further enhanced by surface treatment of at least a portion of the inorganic mineral particles. Specifically, surface treated particles will allow for more asphalt binder (e.g., bitumen) and more of the pigment component (e.g., carbon black) to settle or reside in the upper most areas (e.g., surface layers) with greatest exposure to weathering, UV exposure, etc., as disclosed herein. See FIG. 9.

Table 3 shows ATR-FTIR data for surface treated calcium carbonate (Ex. 3) and calcium carbonate without surface treatment (Ex. 4). Each sample was tested either at $t_0$ or $t_{1000}$ with respect to accelerated weather testing and corresponds to either a top layer or a bottom layer of the dried asphalt slurry seal. Table 3 shows more available bitumen in a top layer of the dried asphalt slurry seal compared to the bottom layer. Further, compositions with surface treated calcium carbonate result in more bitumen in a top layer of the dried asphalt slurry seal as compared to the untreated samples.

TABLE 3

Untreated vs. Treated Calcium Carbonate; ATR-FTIR.

| Sample | Wavenumbers & Peak Area | | | | Peak Area Ratios | | | |
| --- | --- | --- | --- | --- | --- | --- | --- | --- |
| | 715 cm$^{-1}$ | 1040 cm$^{-1}$ | 3000 cm$^{-1}$ | 3725 cm$^{-1}$ | 1040/715 | 3000/1040 | 3000/715 | 3725/3000 |
| Untreated at $t_{1000}$ (top) | 0.01181 | 1.1526 | 0.1232 | 3.6965 | 97.6 | 0.1 | 10.4 | 30.00 |
| Treated at $t_{1000}$ (top) | 0.01163 | 1.7388 | 0.5868 | 6.2731 | 149.5 | 0.3 | 50.5 | 10.69 |
| Untreated at $t_0$ (top) | 0.1384 | 2.4139 | 10.205 | 2.098 | 17.4 | 4.2 | 73.7 | 0.21 |
| Treated at $t_0$ (top) | 0.1342 | 2.1759 | 11.086 | 1.726 | 16.2 | 5.1 | 82.6 | 0.16 |
| Untreated at $t_{1000}$ (bottom) | 0.1775 | 2.2626 | 10.672 | 1.279 | 12.7 | 4.7 | 60.1 | 0.12 |
| Treated at $t_{1000}$ (bottom) | 0.1732 | 1.9472 | 11.403 | 1.089 | 11.2 | 5.9 | 65.8 | 0.10 |

As further exemplified by the examples below and the embodiments disclosed herein, an asphalt slurry seal is provided that comprises a multi-modal, small surface area mineral filler, which when applied to a surface, has a CIELAB L* value and/or wet track abrasion value (or both) less than a comparable asphalt slurry seal in which the multi-modal, small surface area mineral filler is fully replaced by an inorganic mineral blend that does not satisfy at least one of the above characteristics (e.g. kaolin, clay, etc.). In certain embodiment, although not meant to be limiting, the multi-modal, small surface area mineral filler is characterized by a) a first maximum (or mode) in the range of about 0.1 μm to about 15 μm; b) a second maximum (or mode) in the range of about 5 μm to about 35 μm; and c) about 5 wt. % to about 40 wt. % of the particles in the inorganic mineral blend (dry weight) fall within a first distribution represented by the first maximum and are in the range of about 0.1 μm to about 15 μm, wherein the inorganic mineral blend has a composite BET specific surface area of less than 4.5 m$^2$/g, and/or less than 6.0 m$^2$/g, and wherein, optionally at least a portion of the filler is surface treated and/or further maxima (or modes) are present.

EXAMPLES

The following examples may additionally illustrate the invention but are not meant to restrict the invention to the exemplified embodiments.

Materials
Laboratory Equipment
Particle Size Distribution

Particle sizes were measured using a laser diffraction method on a Mastersizer instrument from Malvern-Panalytical. The particle size determination was calculated using Mie and Fraunhofer theory, as appropriate.

BET Specific Surface Area

The specific surface area of a material was measured using a Tristar II instrument from Micromeritics.

Viscosity Measurement

All Stormer-viscosities were measured at room temperature (20±5° C.) with a KU-2 model by BYK equipped with an appropriate spindle @ 200 RPM.

Accelerated Weather Testing

All color data, e.g., CIELAB L*, a*, and b* values, were measured using a QUV/se instrument having a UVA-340 lamp from Q-Lab.

Sample Preparation

Equipment: high shear mixer (i.e., Dispermat mixer), balance (4 Kg+/−0.00), fume hood or snorkel, Hamilton Beach mixer (optional), spatula & scoop, emulsifiers and other additives (as indicated in test plan), mixer cups (steel and plastic), emulsion storage containers (steel/plastic), PTFE (steel reinforced spatula), Hobart mixer and bowl (optional), and timer.

Raw Materials

Minerals: calcium carbonate (Omyaroad-PT (e.g., Omyasil-PT), Omyaroad-SA (e.g., Pulpro 20-SA and Pulpro 30-SA), Omyaroad F-PT (a.k.a. Betocarb F-PT), Omyaroad F-SA (e.g., Snowhite 3 and Pulpro 3)), barite (technical grade), kaolin (ball clay), and slate (desert).

Pigments: carbon black (e.g., N-330).

Additives: bentonite (e.g., Sodium), polymers, etc. (as indicated per example).

Surface Treatment Materials: blend of palmitic acid and stearic acid (approximately 60:40 ratio).

Asphalt Emulsions: CSS-1h, CSS-1, SS-1h, and SS-1.

Methods

Standard methods known by persons having ordinary skill in the art were used to test and characterize the asphalt slurry seals described herein. ASTM method references include D977-05 (standard specification for emulsified asphalt), D7404 (standard test method for determination of emulsified asphalt residue by moisture balance analyzer), modified G154 (standard test method for accelerated weathering), D4799 (standard test method for determining CIELAB values), D3910-15 (standard test method for wet track abrasion), and D562-10 (standard test method for Stormer viscosity).

Measurements
Particle Size Distribution

The method and the instrument are known by persons having ordinary skill in the art and are commonly used to determine the particle size of fillers and pigments. The measurements were carried out in an aqueous solution of approximately 3 mg/L Na$_6$P$_6$O$_{18}$. The samples were dispersed using a high-speed stirrer and sonicated.

BET Specific Surface Area

The specific surface area of a material was determined by the Brunaur Emmett Teller (BET) method with nitrogen as adsorbing gas. The method is well known by persons having ordinary skill in the art and defined in ISO 9277:2010. The sample is pre-conditioned at 115° C. and purged with dry nitrogen prior to analysis.

Viscosity

Viscosity was measured using a BYK stormer viscometer, and is well known by persons having ordinary skill in the art.

Accelerated Weather Testing

All CIELAB color values were measured according to ASTM G154 (modified for an asphalt specimen as described below), using Cycle 1 as listed in the standard, which uses a lamp (UVA-340) having an irradiance of 0.68 W/m$^2$/nm at an approximate wavelength of 340 nm at an exposure cycle of 8 hours of UV at 60° C. and 4 hours of condensation at 50° C. Asphalt slurry seals were applied to aluminum QUV panels at a thickness of 1/16 of an inch. CIELAB values were obtained at $t_0$ (a time prior to accelerated weather testing), and at subsequent time intervals, e.g., $t_{250}$, $t_{500}$, $t_{750}$, and/or $t_{1000}$, which correspond to 250, 500, 750 and 1000 hours of accelerated weather testing.

Wet Track Abrasion Test (Durability)

Durability of asphalt slurry seals is determined by the wet track abrasion test using the International Slurry Surfacing Association (ISSA) method in Technical Bulletin No. 100, and ASTM D3910-15. Approximately 200-250 mL of the asphalt slurry seal is poured onto the middle of the ASTM D226 #30 Felt and allowed to sit/dry for 5 minutes before placing in a forced air oven (set to 60° C.) to dry for 15-24 hours. After drying, the sample (dried asphalt+felt) is weighed. The sample is submerged in a pan of deionized water (such that the sample is covered by approximately one-half inch) and allowed to soak for 1 hour or 6 days. The Hobart (N-50) mixer, fitted with abrasion accessories, should be set to run for 5 minutes and 15 seconds. Subsequently, the sample is rinsed with deionized water and placed in an oven at 60° C. for 15-24 hours before being weighed.

Sample Preparation

Bentonite Conditioning. Add an appropriate amount of bentonite to water while mixing under high shear, e.g., at a speed near the splatter point, and continue mixing the suspension for 5 minutes after all the bentonite has been added. Scrape the sides of the mixing container and continue mixing for 10 minutes at high shear. Transfer the bentonite suspension to a Nalgene bottle and store for 16 hours before use.

Carbon Black Conditioning. Add an appropriate amount of carbon black to water while mixing under high shear; continue mixing the suspension for 5 minutes after all the carbon black has been added. Scrape the sides of the mixing container and continuing mixing for 10 minutes at high shear; repeat once. Transfer the carbon black suspension to a Nalgene bottle.

Asphalt Slurry Seal. The exact protocol depends on the final parameters and ingredients of the asphalt slurry seal, and follows standard practices known by persons having ordinary skill in the art. Typically, water and half the amount of rheology modifier (for example, pre-conditioned bentonite) are mixed together to form a suspension, then the mineral filler is mixed in, followed by the pigment component (for example, carbon black) and functional minerals (for example, sand or slate), and then the remaining half of the rheology modifier. The suspension is mixed to a smooth consistency and then the asphalt emulsion is added followed by other additives. The additives may be added before and/or after the asphalt emulsion is added.

A multi-modal particle size distribution may be obtained by a variety of mechanisms. For example, particles with different distribution curves may be used, or particles of the same material subjected to different processing may be used. For example, particles of one inorganic mineral may have a different particle size distribution than particles of another inorganic mineral, such that a resulting particle size distribution curve for the mixture has a first mode and a different second mode, or even a different third mode, or more.

As described above, there are a variety of mechanisms by which an inorganic mineral blend having a multi-modal particle size distribution may be obtained. In accordance with the disclosure herein, the multi-modal nature of the inorganic mineral blend (e.g., first, second, and/or higher maxima) may be measured and/or determined either in the particle size distribution of the blend itself and/or by the particle size distribution of first and second (or higher) inorganic minerals prior to blending (see FIGS. 1-3).

Non-limiting examples of asphalt slurry seal compositions, wherein the inorganic mineral blend comprises a first inorganic mineral and a second inorganic mineral, are shown below in Table 4 and properties of the first inorganic mineral and second inorganic mineral are shown below in Table 5.

TABLE 4

| Materials | Commercial Asphalt Sealer wt. % (wet) | Invention Asphalt Sealer wt. % (wet) |
|---|---|---|
| Asphalt Emulsion | 25-35 | 19-31 |
| Mineral Filler | | |
| first inorganic mineral | 0 | 15-32 |
| second inorganic mineral | 0 | 3-11 |
| Other Minerals | 15-35 | 0-8 |
| Bentonite | 0-5 | 0-2.5 |
| Carbon Black | 1-3 | 0.5-1.1 |
| Water | 1755 | 34-62.5 |

TABLE 5

| Property | First Inorganic Mineral | Second Inorganic Mineral |
|---|---|---|
| Particle Size (um) | ~15 μm to ~1 mm | ~0.1 μm to ~15 μm |
| Surface Area ($m^2/g$) | X < 0.6 | X < 4.5 |
| CIELAB a* | −0.2-0.2 | −0.2-0.2 |
| CIELAB b* | 0-6 | 0-6 |
| Morphology | rhombohedral | rhombohedral |

EXAMPLES—RESULTS

In the following examples, which are not meant to be in any way limiting, all calcium carbonate blend components are available from Omya International AG, under the tradenames indicated.

Example 1 comprises a bi-modal blend of calcium carbonate. Specifically, example 1 comprises a calcium carbonate mineral blend of Omyaroad-SA (Pulpro 20-SA) (first inorganic mineral) and Omyaroad F-SA (Snowhite 3/Pulpro 3) (second inorganic mineral), a CSS-1h asphalt emulsion, N-330 carbon black, Na-bentonite, and water.

Example 2 comprises a tri-modal blend of calcium carbonate. Specifically, example 2 comprises a calcium carbonate mineral blend of Omyaroad-SA (Pulpro 30-SA) (first inorganic mineral) and Omyaroad F-SA (Snowhite 3/Pulpro 3) (second inorganic mineral), CSS-1h asphalt emulsion, N-330 carbon black, Na-bentonite, and water.

Example 3 comprises a bi-modal blend of calcium carbonate wherein the particles of the second inorganic mineral are surface treated. Specifically, example 3 comprises a calcium carbonate mineral blend of Omyaroad-PT (Omyasil-PT) (first inorganic mineral) and 2SST-FL (second inorganic mineral), a CSS-1h asphalt emulsion, recycled glass (e.g., sand), bentonite, and water.

Example 4 comprises a bi-modal blend of calcium carbonate. Specifically, example 4 comprises a calcium carbonate mineral blend of Omyaroad-PT (Omyasil-PT) (first inorganic mineral) and Omyaroad F-PT (second inorganic mineral), a CSS-1h asphalt emulsion, recycled glass (e.g., sand), bentonite, and water.

Example 5 comprises a bi-modal blend of calcium carbonate. Specifically, example 5 comprises a calcium carbonate mineral blend of Omyaroad-PT (Omyasil-PT) (first inorganic mineral) and Omyaroad F-PT (second inorganic mineral), a CSS-1h asphalt emulsion, bentonite, and water.

Example 6 comprises a bi-modal blend of calcium carbonate. Specifically, example 6 comprises a calcium carbonate mineral blend of Omyaroad-PT (Omyasil-PT) (first inorganic mineral) and Omyaroad F-PT (second inorganic mineral), a CSS-1h asphalt emulsion, N-330 carbon black, Na-bentonite, and water.

The composition of examples 1 through 6, by wt. % as calculated based on the slurry (wet), is shown below in Table 6.

TABLE 6

| Material | Ex. 1 | Ex. 2 | Ex. 3 | Ex. 4 | Ex. 5 | Ex. 6 |
|---|---|---|---|---|---|---|
| First inorganic mineral | 21.7 | 24.7 | 22.2 | 22.2 | 22.8 | 31.5 |
| Second inorganic mineral | 6.9 | 3.8 | 6.1 | 6.2 | 10.6 | 3.5 |
| Asphalt Emulsion | 21.7 | 21.9 | 19.5 | 19.4 | 30.1 | 27.4 |
| Recycled Glass | 0 | 0 | 5.53 | 5.59 | 0 | 0 |
| Bentonite | 1.8 | 1.9 | 1.41 | 1.4 | 1.79 | 1.5 |
| Carbon Black | 0.6 | 1.1 | 0 | 0 | 0 | 1 |
| Water | 47.2 | 46.6 | 45.2 | 45.2 | 34.8 | 35.1 |

The composition of examples 1 through 6, by dry wt. %, is shown below in Table 7.

TABLE 7

| Material | Ex. 1 | Ex. 2 | Ex. 3 | Ex. 4 | Ex. 5 | Ex. 6 |
|---|---|---|---|---|---|---|
| First inorganic mineral | 47.4 | 8.2 | 40.6 | 40.6 | 42.2 | 57.6 |
| Second inorganic mineral | 15 | 53.1 | 11.2 | 11.2 | 19.6 | 6.4 |
| Asphalt Emulsion | 32.2 | 32.2 | 35.6 | 35.4 | 35 | 31.4 |
| Recycled Glass | 0 | 0 | 10.1 | 10.2 | 0 | 1.81 |
| Bentonite | 4.01 | 4.06 | 2.57 | 2.56 | 3.32 | 2.79 |
| Carbon Black | 1.4 | 2.4 | 0 | 0 | 0 | 1.81 |

Wet track abrasion (i.e., durability) test results for examples 1 through 6 are shown below in Table 8. +/−value is 1 sigma ($\sigma$).

TABLE 8

| | Wet Track Abrasion Test Results (g/ft$^2$) | | |
|---|---|---|---|
| Example | 1 hr (n = 3) | 1 hr (n = 1) | 6 d (n = 1) |
| 1 | 11.4 ± 1.8 | — | — |
| 2 | 7.7 ± 1.5 | — | — |
| 3 | — | 5.4 | 13.3 |
| 4 | — | 7.3 | 14.7 |
| 5 | — | 7.2 | 9.5 |
| 6 | — | 11.3 | 14.9 |

Color (C10) test results for examples 1-4 are shown below in Table 9.

TABLE 9

| | Ex. 1 | Ex. 2 | Ex. 3 | Ex. 4 |
|---|---|---|---|---|
| L* | 23.5 ± 0.5 | 23.0 ± 0.4 | 22.76 | 22.66 |
| a* | −0.12 ± 0.03 | −0.18 ± 0.03 | 0.36 | 0.4 |
| b* | −0.15 ± 0.04 | −0.24 ± 0.05 | 0.23 | 0.26 |

Color (QUV) test results for examples 4 and 6 are shown below in Tables 10 and 11 and reveal the effects of carbon black on color (see FIG. 6 and FIG. 7).

TABLE 10

| (Example 4 - no carbon black; FIG. 6) | | | | | |
|---|---|---|---|---|---|
| Hours: | 0 | 250 | 500 | 750 | 1000 |
| L* | 22.66 | 23.23 | 23.01 | 23.62 | 24.02 |
| a* | 0.4 | 0.83 | 1.31 | 1.86 | 2.21 |
| b* | −0.26 | 2.77 | 3.48 | 4.52 | 4.85 |

TABLE 11

| (Example 6 - with carbon black; FIG. 7) | | | | | |
|---|---|---|---|---|---|
| Hours: | 0 | 250 | 500 | 750 | 1000 |
| L* | 22.5 | 18.43 | 16.53 | 15.59 | 15.56 |
| a* | 0.5 | 0.59 | 0.44 | 0.29 | 0.26 |
| b* | −0.78 | 1.99 | 1.36 | 0.72 | 0.39 |

ADDITIONAL EXAMPLES

In the following examples, which are not meant to be in any way limiting, all calcium carbonate blend components are available from Omya International AG, under the tradenames indicated. In addition, the asphalt slurry seal compositions of Examples 7, 8, and 9 include lignosulfonic acid, which is added solely for testing, e.g., lignosulfonic acid is used as a stressor to test durability differences in formulations that would otherwise be difficult to discern with the Wet Track Abrasion test.

Example 7 comprises a surface treated calcium carbonate, namely, 2SST-FL, an SS-1 asphalt emulsion, lignosulfonic acid, a carbon black slurry, bentonite, and water.

Example 8 comprises a calcium carbonate, namely, 2SS, an SS-1 asphalt emulsion, lignosulfonic water, carbon black, bentonite, and water.

Example 9 comprises a surface treated calcium carbonate, namely, 2SST-FL, an SS-1 asphalt emulsion, lignosulfonic acid, carbon black slurry, and water.

The composition of Examples 7, 8, and 9, by wt. % as calculated based on the slurry (wet) and by dry wt. %, is shown below in Table 12.

TABLE 12

| | Ex. 7 | | Ex. 8 | | Ex. 9 | |
|---|---|---|---|---|---|---|
| Component | (wet) | (dry) | (wet) | (dry) | (wet) | (dry) |
| 2SS or 2SST | 23.4 | 59 | 23.3 | 58.9 | 24.7 | 62.7 |
| Asphalt Emulsion | 19 | 32 | 19 | 32 | 19.1 | 32.2 |
| Lignosulfonic Acid | 1.02 | 2.6 | 1.03 | 2.6 | 1.03 | 2.6 |
| Bentonite | 1.59 | 4.01 | 1.58 | 4.01 | 0 | 0 |
| Carbon Black | 1 | 2.5 | 1 | 2.5 | 1 | 2.5 |
| Water | 54 | n/a | 54.1 | n/a | 54.1 | n/a |

Wet track abrasion (i.e., durability) test results for Examples 7, 8, and 9 are shown below in Table 13.

TABLE 13

| | Wet Track Abrasion Test Results (g/ft$^2$) |
|---|---|
| Example | 1 hr (n = 3) |
| 7 | 13.1 ± 3 |
| 8 | 14.5 ± 3.2 |
| 9 | 11.9 ± 3.8 |

COMMERCIAL EXAMPLES

For comparison purposes, the following are examples of select commercial sealers and accelerated weather testing results.

TABLE 14

Commercial Sealer 1 (without calcium carbonate)

| Time (hours) | $t_0$ | $t_{250}$ | $t_{500}$ | $t_{750}$ | $t_{1000}$ |
|---|---|---|---|---|---|
| L* | 22.77 | 29.25 | 28.1 | 27.24 | 27.17 |
| a* | 0.19 | −0.51 | −0.45 | −0.42 | −0.40 |
| b* | −0.04 | −1.82 | −0.75 | −0.52 | −0.24 |
| Gloss | 0.7 | 0.5 | 0.3 | 0.3 | 0.2 |

TABLE 15

Commercial Sealer 2 (with calcium carbonate, not bi-modal)

| Time (hours) | $t_0$ | $t_{250}$ | $t_{500}$ | $t_{750}$ | $t_{1000}$ |
|---|---|---|---|---|---|
| L* | 22.63 | 20.68 | 18.24 | 16.94 | 16.32 |
| a* | 0.20 | 0.17 | 0.31 | 0.28 | 0.28 |
| b* | 0.05 | 0.16 | 0.45 | 0.60 | 0.55 |
| Gloss | 0.7 | 0.3 | 0.1 | 0.1 | 0.1 |

In the above examples, Commercial sealer 1 (without calcium carbonate) has an increased L* overtime as compared to the enhanced color characteristics shown, for example, in Example 6, using calcium carbonate. Commercial sealer 2 has comparable L* and durability characteristics to the bi-modal asphalt slurry seals disclosed herein, but Commercial sealer 2 requires significantly more asphalt binder which in turn greatly increases cost.

As such, the inventors surprisingly found that durability, color the aesthetic characteristics, and the cost of an asphalt slurry seal could be optimized by controlling the multi-modal particle size distribution of calcium carbonate. An analysis of commercial asphalt slurry seals and of the mineralogy of asphalt slurry seals in general showed that using calcium carbonate over other minerals confers benefits to the asphalt slurry seal in terms of durability and environmental aging. Further, modulating the particle distribution confers greater benefits that may lead to an overall reduction in the cost to manufacture the asphalt slurry seal, and may further provide a smoother surface, reduced cracking, and enhanced aesthetics.

In further embodiments herein, a process for preparing an asphalt slurry seal is provided. By way of example, the process may comprise the steps of providing a mineral filler comprising an inorganic mineral blend, wherein the inorganic mineral blend has a multi-modal particle size distribution with at least a first maximum and a second maximum. The multi-modal nature of the blend may be expressed in the blend itself, and/or in one or more inorganic mineral components that make up the blend prior to blending.

The mineral filler is characterized by a small specific surface area; for example, calcium carbonate and/or other similar inorganic minerals with minimized specific surface area. As disclosed herein, and by way of example, the inorganic mineral blend will comprise a first maximum (or mode) in the range of about 0.1 μm to about 15 μm and a second maximum (or mode) in the range of about 5 μm to about 35 μm; although, other ranges, values and subranges for the first and second maxima are contemplated as further disclosed herein. Additionally, further maxima (third, fourth modes, etc.) may also be present. In exemplary embodiments, the process will also incorporate the additional step of surface treating at least a portion of the inorganic mineral blend to, for example, further reduce surface interactions.

In preparing the inorganic mineral blend, about 5 wt. % to about 40 wt. % of the particles in the inorganic mineral blend (dry weight) will be in the range of about 0.1 μm to about 15 μm; although, other ranges, values and subranges are contemplated as further disclosed herein.

The process includes the further steps of providing an additive component comprised of at least one rheology modifier (e.g., bentonite); a pigment component comprised of at least one pigment (e.g., carbon black), and water, and thereby forming a suspension by mixing the water, the mineral filler, the pigment component, and the additive component to form an initial suspension. The inorganic mineral blend may either be added as a multi-modal blend, or as individual inorganic mineral components with distinct modes. After the initial suspension is mixed, the asphalt emulsion (as more fully described and disclosed herein), and optionally one or more functional minerals (also described herein), is mixed into the suspension to form the asphalt slurry seal.

Although the above method is described herein as one example, other methods known in the art for preparing an asphalt slurry seal are contemplated as being within the scope of this disclosure, and will depend on physical and chemical characteristics of the individual components that make up the asphalt slurry seal.

In accordance with further embodiments, a surface pavement composition is provided which comprises the asphalt slurry seal and is thereafter applied to a surface pavement or other pre-existing asphalt.

As will be readily appreciated by persons having ordinary skill in the art, properties tested in the examples may vary significantly depending upon the particular composition of the asphalt emulsion, inorganic filler material and/or other inorganic minerals used, and the foregoing examples are nonlimiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or article that "comprises", "has", "includes" or "contains" one or more steps or elements possesses those one or more steps or elements, but is not limited to possessing only those one or more steps or elements. Likewise, a step of a method or an element of an article that "comprises", "has", "includes" or "contains" one or more features possesses those one or more features, but is not limited to possessing only those one or more features.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by persons having ordinary skill in the art to accomplish the same objectives. Accordingly, this disclosure and the appended claims are intended to cover all such further and alternative aspects and embodiments as fall within the true spirit and scope of the invention.

The invention claimed is:

1. An asphalt slurry seal with improved durability comprising:
   a mineral filler comprising an inorganic mineral blend, wherein the inorganic mineral blend is a calcium carbonate mineral blend; and wherein
      the calcium carbonate mineral blend has a multi-modal particle size distribution comprising at least a first maximum and a second maximum, wherein
      a. the first maximum is in the range of about 0.1 μm to about 15 μm;
      b. the second maximum is in the range of about 5 μm to about 35 μm; and
      c. about 5 wt. % to about 40 wt. % of the particles in the calcium carbonate mineral blend (dry weight) fall within a first distribution represented by the first maximum and are in the range of about 0.1 μm to about 15 μm; and
      d. the particles of the first maximum have a BET specific surface area of about 4 $m^2/g$ to about 15 $m^2/g$;
   a pigment component comprising at least one pigment, wherein the at least one pigment comprises carbon black;
   an additive component comprising at least one rheology modifier;
   an asphalt emulsion; and
   water.

2. The asphalt slurry seal of claim 1, wherein the second maximum is in the range of about 15 μm to about 35 μm.

3. The asphalt slurry seal of claim 1, wherein the particle size distribution of the calcium carbonate mineral blend comprises at least a further maximum within a particle size range of about 0.1 μm to about 1 mm.

4. The asphalt slurry seal of claim 3, wherein the first maximum is in the range of about 0.1 μm to about 5 μm, the second maximum is in the range of about 5 μm to about 20 μm, and the at least one further maximum is in the range of about 20 μm to about 300 μm.

5. The asphalt slurry seal of claim 1, wherein the calcium carbonate mineral blend particles with the second maximum have a BET specific surface area of less than about 0.8 $m^2/g$.

6. The asphalt slurry seal of claim 1, wherein the calcium carbonate mineral blend further comprises at least one inorganic mineral selected from the group consisting essentially of barite, dolomite, perlite, natural glass, synthetic glass, fumed silica, microsphere, and combinations thereof.

7. The asphalt slurry seal of claim 6, wherein the asphalt slurry seal applied to a substrate has a CIELAB L* value less than a comparable asphalt slurry seal that does not comprise calcium carbonate.

8. The asphalt slurry seal of claim 1, wherein the asphalt slurry seal applied to a substrate has
   a. a first CIELAB L* value and
   b. a second CIELAB L* value, wherein the second CIELAB L* value is obtained after an accelerated weather of at least 1000 hours in accordance with ASTM G154 (modified), and
   wherein the second CIELAB L* value is less than the first CIELAB L* value.

9. The asphalt slurry seal of claim 1, wherein the carbon black agglomerates have a $d_{50}$ particle size less than or equal to the first maximum.

10. The asphalt slurry seal of claim 1, wherein at least a portion of the calcium carbonate mineral blend particles are treated with a surface treatment material.

11. The asphalt slurry seal of claim 10, wherein the surface treatment material comprises at least one hydrophobic agent, and wherein said hydrophobic agent is selected from the group consisting essentially of stearic acid, palmitic acid, alkyl succinic anhydride, and combinations thereof.

12. The asphalt slurry seal of claim 1, wherein the at least one pigment further comprises at least one of, a mineral colorant, an organic colorant, a UV stabilizer, and combinations thereof.

13. The asphalt slurry seal of claim 1, wherein the rheology modifier comprises bentonite.

14. The asphalt slurry seal of claim 13, wherein the asphalt slurry seal comprises bentonite in an amount less than about 5 wt. %, calculated based on the weight of the slurry.

15. The asphalt slurry seal of claim 1, wherein the additive component further comprises at least one of styrene butadiene rubber, polymer, biocide, or combinations thereof.

16. The asphalt slurry seal of claim 1, wherein the asphalt emulsion is selected from the group consisting essentially of CSS-1, CSS-1h, SS-1, SS-1h, and combinations thereof.

17. The asphalt slurry seal of claim 1, wherein the mineral filler further comprises one or more functional minerals in an amount less than about 15 wt. %, calculated based on the weight of the slurry, and wherein the one or more functional minerals are selected from the group consisting essentially of slate, sand, recycled glass, kaolin, clay, silicate, and combinations thereof.

18. The asphalt slurry seal of claim 1, wherein the asphalt slurry seal has a wet track abrasion of about 2 $g/ft^2$ to about 25 $g/ft^2$.

19. The asphalt slurry seal of claim 1, wherein the asphalt slurry seal has:
a composite $d_{50}$ particle size of less than about 35 μm, and
a composite $d_{90}$ particle size in the range of about 180 μm to about 300 μm,
wherein the particles with a composite doo particle size in the range of about 180 μm to about 300 μm comprise about 8 wt. % to about 15 wt. %, based on the weight of the slurry.

20. The asphalt slurry seal of claim 1, wherein the asphalt emulsion in the slurry comprises a surfactant in an amount less than about 1 wt. %, calculated based on the weight of the slurry, and said asphalt emulsion is stable at about pH 7 to about pH 13.

21. A pavement surfacing composition comprising the asphalt slurry seal of claim 6, wherein
a top layer of the pavement surfacing composition comprises more of the pigment component and asphalt emulsion as compared to a bottom layer of the pavement surfacing composition, and wherein the top layer is dark black in color with a CIELAB L* value that decreases over time.

22. A process for preparing an asphalt slurry seal, comprising the steps of:
a) providing a mineral filler comprising an inorganic mineral blend, wherein the inorganic mineral blend is a calcium carbonate mineral blend; and wherein
the calcium carbonate mineral blend has a multi-modal particle size distribution with at least a first maximum and a second maximum, wherein
the first maximum is in the range of about 0.1 μm to about 15 μm, the particles of the first maximum having a BET specific surface area of about 4 m²/g to about 15 m²/g, and the second maximum is in the range of about 5 μm to about 35 μm, and
about 5 wt. % to about 40 wt. % of the particles in the calcium carbonate mineral blend (dry weight) are in the range of about 0.1 μm to about 15 μm;
b) providing an additive component comprised of at least one rheology modifier; a pigment component comprised of at least one pigment, and water;
c) forming a suspension by mixing the water, the mineral filler, the pigment component, and the additive component,
d) providing an asphalt emulsion and optionally one or more functional minerals;
e) mixing the asphalt emulsion into the suspension; and
f) mixing the optional one or more functional minerals into the suspension.

23. The process of claim 22, further comprising the steps of:
providing a surface treatment material; and
at least partially treating the mineral filler with the surface treatment material before forming the suspension in c).

* * * * *